US007949461B2

(12) United States Patent
Takahashi

(10) Patent No.: US 7,949,461 B2
(45) Date of Patent: May 24, 2011

(54) ENGINE START CONTROL APPARATUS, ENGINE START CONTROL METHOD, AND MOTOR VEHICLE EQUIPPED WITH ENGINE START CONTROL APPARATUS

(75) Inventor: Shigenori Takahashi, Aniyo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 748 days.

(21) Appl. No.: 11/721,940

(22) PCT Filed: Dec. 19, 2005

(86) PCT No.: PCT/JP2005/023696

§ 371 (c)(1), (2), (4) Date: Jun. 15, 2007

(87) PCT Pub. No.: WO2006/064980

PCT Pub. Date: Jun. 22, 2006

(65) Prior Publication Data

US 2008/0092841 A1 Apr. 24, 2008

(30) Foreign Application Priority Data

Dec. 17, 2004 (JP) ................................ 2004-365908
Jun. 17, 2005 (JP) ................................ 2005-177472

(51) Int. Cl.
*G06F 19/00* (2006.01)
*G06G 7/70* (2006.01)
*G06G 7/76* (2006.01)

(52) U.S. Cl. ..................... 701/113; 701/111; 123/179.4; 123/179.16; 123/406.21; 123/406.27; 123/406.14

(58) Field of Classification Search ............... 123/179.4, 123/179.16, 179.17, 406.14, 406.21, 406.26, 123/406.27, 406.29, 406.37, 406.76; 701/103, 701/111, 112, 113
See application file for complete search history.

(56) References Cited

U.S. PATENT DOCUMENTS 1,964,432 A * 6/1934 Geyer .......................... 180/291
(Continued)

FOREIGN PATENT DOCUMENTS

EP 1439300 A1 7/2004
(Continued)

*Primary Examiner* — Stephen K Cronin
*Assistant Examiner* — Anthony L Bacon
(74) *Attorney, Agent, or Firm* — Kenyon & Kenyon LLP

(57) ABSTRACT

In a motor vehicle with idle stop function, upon satisfaction of preset engine restart conditions (step S205), automatic engine restart control refers to a preset map representing a variation in amount of fuel Q1, which is to be initially injected into a cylinder Cyin stopping in an intake stroke, against the piston stop position Pin of the cylinder Cyin, and specifies the amount of fuel Q1 corresponding to the detected piston stop position Pin of the cylinder Cyin (step S220). The automatic engine restart control then controls an injector to inject the specified amount of fuel Q1 into an intake port of the cylinder Cyin (step S230). Under the condition that the piston stop position Pin of the cylinder Cyin suggests low gas intake performance, the increased amount of fuel Q1 is injected into the intake port of the cylinder Cyin. This arrangement desirably reduces a misfire rate at the timing of first combustion and thereby improves the startability of an engine. When the amount of fuel Q1 specified at step S220 is equal to zero, the cylinder Cyin is not subject to the first combustion. Such control desirably prevents poor emission.

10 Claims, 11 Drawing Sheets

U.S. PATENT DOCUMENTS

| | | | | |
|---|---|---|---|---|
| 4,989,554 | A | 2/1991 | Kushida et al. | |
| 5,357,790 | A * | 10/1994 | Hosoya | 73/114.04 |
| 6,568,372 | B1 | 5/2003 | Kanno | |
| 7,011,063 | B2 * | 3/2006 | Condemine et al. | 123/179.4 |
| 7,082,899 | B2 * | 8/2006 | Hanson et al. | 123/41 E |
| 7,234,442 | B2 * | 6/2007 | Hanson et al. | 123/332 |
| 7,472,016 | B2 * | 12/2008 | Takeyama et al. | 701/113 |
| 7,774,110 | B2 * | 8/2010 | Sago | 701/29 |
| 2002/0166531 | A1 * | 11/2002 | Ackermann et al. | 123/179.16 |
| 2005/0194964 | A1 * | 9/2005 | Okada et al. | 324/165 |

FOREIGN PATENT DOCUMENTS

| | | | |
|---|---|---|---|
| EP | 1577526 | A2 | 9/2005 |
| JP | 63-208644 | A | 8/1988 |
| JP | 09-042012 | A | 2/1997 |
| JP | 2003-56383 | A | 2/2003 |
| JP | 2004-346770 | A | 12/2004 |
| WO | 00/65217 | A1 | 11/2000 |

* cited by examiner

ENGINE START CONTROL APPARATUS, ENGINE START CONTROL METHOD, AND MOTOR VEHICLE EQUIPPED WITH ENGINE START CONTROL APPARATUS

This is a 371 national phase application of PCT/JP2005/023696 filed 19 Dec. 2005, which claims priority to Japanese Patent Applications No. 2004-365908 & No. 2005-177472, filed 17 Dec. 2004 and 17 Jun. 2005 respectively, the contents of which are incorporated herein by reference.

FIELD OF THE INVENTION

The present invention relates to an engine start control apparatus, a corresponding method, and vehicle with the apparatus mounted thereon.

BACKGROUND ART

Engine start control apparatuses have been proposed to inject a first supply of fuel for restarting an engine into a cylinder stopping in an intake stroke in an engine stop state, to start engine cranking, and to subsequently ignite the air-fuel mixture for first combustion in the cylinder stopping in the intake stroke. For example, an engine start control apparatus disclosed in Japanese Patent Laid-Open Gazette No. 2003-56383 injects the first supply of fuel for restarting the engine into the cylinder during a stop of the engine and thereby shortens the starting time of the engine.

DISCLOSURE OF THE INVENTION

In the prior art engine start control apparatus, however, some piston stop position of the cylinder stopping in the intake stroke in the engine stop state may cause insufficient introduction of the air-fuel mixture into the cylinder in a first intake stroke and may thus result in a misfire at the start of engine cranking. The misfire undesirably lengthens the starting time of the engine and causes poor emission by the unconsumed fuel gas. Under some piston stop position of the cylinder stopping in the intake stroke in the engine stop state, the insufficient introduction of the fuel into the cylinder in the first intake stroke tends to produce the air-fuel mixture unsuitable for combustion in the cylinder. The combustion torque generated from the air-fuel mixture unsuitable for combustion is significantly smaller than the combustion torque generated from the air-fuel mixture suitable for combustion. Namely the combustion torque generated on a start of the engine varies depending upon the piston stop position of the cylinder stopping in the intake stroke in the engine stop state. This undesirably makes the level of torque changeable and unstable on the start of the engine.

The object of the invention is thus to eliminate the drawbacks of the prior art technique and to reduce a misfire rate on a start of an engine and thereby improve the startability of the engine. The object of the invention is also to prevent poor emission on the start of the engine. The object of the invention is further to stabilize a level of torque generated on the start of the engine and thereby improve the drivability on the start of the engine.

In order to attain at least part of the above and the other related objects, the present invention is constructed as follows.

The present invention is directed to a first engine start control apparatus that performs control, upon satisfaction of a preset engine restart condition in an engine stop state, to inject a fuel from a fuel injection unit, which is attached to a specific cylinder stopping in an intake stroke, into an intake port of the specific cylinder and to implement first combustion in the specific cylinder on a start of an engine. The first engine start control apparatus includes: a detection unit that detects a piston stop position of the specific cylinder stopping in the intake stroke in the engine stop state; an engine restart condition judgment module that determines whether the preset engine restart condition is satisfied in the engine stop state; and a fuel injection control module that, upon determination of satisfaction of the preset engine restart condition by the engine restart condition judgment module, specifies an amount of fuel, which is to be injected into the intake port of the specific cylinder stopping in the intake stroke, corresponding to the piston stop position detected by the detection unit, and controls the fuel injection unit to inject the specified amount of fuel into the intake port of the specific cylinder.

Upon satisfaction of the preset engine restart condition, the first engine start control apparatus of the invention specifies the amount of fuel, which is to be injected into the intake port of the specific cylinder stopping in the intake stroke, corresponding to the detected piston stop position of the specific cylinder, and injects the specified amount of fuel into the intake port of the cylinder. The amount of fuel injection is varied according to the piston stop position of the specific cylinder stopping in the intake stroke in the engine stop state. Increasing the amount of fuel injection under the condition of low gas intake performance of the specific cylinder desirably reduces a misfire rate at the time of ignition and thereby improves the startability of the engine.

In one preferable embodiment of the first engine start control apparatus of the invention, the fuel injection control module sets a fixed amount to the amount of fuel, which is to be injected into the intake port of the specific cylinder stopping in the intake stroke, in the detected piston stop position between a top dead center and a predetermined middle position of the intake stroke, and increases the amount of fuel to be injected with a variation in detected piston stop position approaching from the predetermined middle position toward a bottom dead center. The gas intake performance of the specific cylinder at a start of engine cranking depends upon the piston stop position of the specific cylinder in the engine stop state. The first engine start control apparatus injects the fixed amount of fuel under the condition that the detected piston stop position suggests sufficient gas intake performance, while injecting the increased amount of fuel under the condition that the detected piston stop position suggests low gas intake performance. Under the condition of low gas intake performance having a high potential of misfire, this arrangement increases the amount of fuel injection to reduce the misfire rate and improve the startability of the engine.

The 'fixed amount' may be an empirically specified air-fuel ratio at a start of the engine, which is in a fuel rich condition and is smaller than a stoichiometric air-fuel ratio in an ordinary drive of a motor vehicle. The 'predetermined middle position' may be an empirically specified piston stop position having a high misfire rate when the fixed amount of fuel is injected into the intake port of the specific cylinder stopping in the intake stroke in the engine stop state. The 'predetermined middle position' is, for example, a piston stop position corresponding to a crank angle advanced from a top dead center of the intake stroke by 120 degrees or in a range around 120 degrees (for example, in a range of 110 to 130 degrees).

In another preferable embodiment of the first engine start control apparatus of the invention, the fuel injection control module increases the amount of fuel, which is to be injected into the intake port of the specific cylinder stopping in the intake stroke, with a variation in detected piston stop position approaching from a top dead center toward a bottom dead center of the intake stroke. The gas intake performance of the specific cylinder at a start of engine cranking depends upon the piston stop position of the specific cylinder in the engine stop state. Under the condition of low gas intake performance having a high potential of misfire, this arrangement increases the amount of fuel injection to reduce the misfire rate and improve the startability of the engine.

In the first engine start control apparatus of the invention, the fuel injection control module may set zero to the amount of fuel, which is to be injected into the intake port of the specific cylinder stopping in the intake stroke, in the detected piston stop position between a predetermined bottom dead center-nearby position and a bottom dead center of the intake stroke. In the piston stop position between the predetermined bottom dead center-nearby position and the bottom dead center, the cylinder stopping in the intake stroke has low gas intake performance. There is a high potential of a misfire at a start of engine cranking under the condition of low gas intake performance. Setting the amount of fuel injection to zero naturally causes no combustion and thereby prevents the poor emission.

The 'predetermined bottom dead center-nearby position' may be an empirically specified piston stop position having a high misfire rate even when the fixed amount or a greater amount of fuel is injected into the intake port of the specific cylinder stopping in the intake stroke in the engine stop state. The 'predetermined bottom dead center-nearby position' is, for example, a piston stop position corresponding to a crank angle advanced from a top dead center of the intake stroke by 160 degrees or in a range around 160 degrees (for example, in a range of 150 to 170 degrees).

In one preferable arrangement of the first engine start control apparatus of the invention, the engine restart condition judgment module determines whether the preset engine restart condition is satisfied during a stop of the engine by idle stop control, and the fuel injection control module controls the fuel injection unit to inject the specified amount of fuel into the intake port of the specific cylinder stopping in the intake stroke during the stop of the engine by the idle stop control. Application of the invention is especially effective for the idle stop control, which repeats engine stops and engine restarts many times during a drive of the motor vehicle.

In one preferable application of the invention, the first engine start control apparatus further includes a misfire identification module that identifies whether the first combustion on the start of the engine results in a misfire.

In this embodiment, upon identification of a misfire by the misfire identification module, the fuel injection control module estimates a remaining amount of fuel unconsumed for the first combustion, computes an amount of fuel, which is to be injected next time into the intake port of the specific cylinder stopping in the intake stroke in the engine stop state, from the estimated remaining amount of fuel, and controls the fuel injection unit to inject the computed amount of fuel into the intake port of the specific cylinder. When the first combustion results in a misfire in the specific cylinder stopping in the intake stroke in the engine stop state, the cause of the misfire is assumed as insufficient introduction of the fuel injected in the intake port into the specific cylinder. On this assumption, the remaining amount of fuel that is not introduced into the specific cylinder but remains in the intake port is estimated. The amount of fuel to be injected next time into the intake port of the specific cylinder is computed from the estimated remaining amount of fuel. Such specification effectively restrains the air-fuel ratio from excessively being in a fuel rich condition and prevents poor emission.

The present invention is also directed to a second engine start control apparatus that performs control, upon satisfaction of a preset engine restart condition in an engine stop state, to inject a fuel from a fuel injection unit, which is attached to a specific cylinder stopping in an intake stroke, into an intake port of the specific cylinder and to implement first combustion in the specific cylinder on a start of an engine. The second engine start control apparatus includes: a misfire identification module that identifies whether the first combustion on the start of the engine results in a misfire; and a fuel injection control module, upon identification of a misfire by the misfire identification module, estimates a remaining amount of fuel unconsumed for the first combustion, computes an amount of fuel, which is to be injected next time into the intake port of the specific cylinder stopping in the intake stroke in the engine stop state, from the estimated remaining amount of fuel, and controls the fuel injection unit to inject the computed amount of fuel into the intake port of the specific cylinder.

When the first combustion on the start of the engine results in a misfire, the second engine start control apparatus of the invention estimates the remaining amount of fuel unconsumed for the first combustion, computes the amount of fuel, which is to be injected next time into the intake port of the specific cylinder stopping in the intake stroke in the engine stop state, from the estimated remaining amount of fuel, and controls the fuel injection unit to inject the computed amount of fuel into the intake port of the specific cylinder. When the first combustion results in a misfire in the specific cylinder stopping in the intake stroke in the engine stop state, the cause of the misfire is assumed as insufficient introduction of the fuel injected in the intake port into the specific cylinder. On this assumption, the remaining amount of fuel that is not introduced into the specific cylinder but remains in the intake port is estimated. The amount of fuel to be injected next time into the intake port of the specific cylinder is computed from the estimated remaining amount of fuel. Such specification effectively restrains the air-fuel ratio from excessively being in a fuel rich condition and prevents poor emission.

In one preferable embodiment of the second engine start control apparatus of the invention, the fuel injection control module subtracts the estimated remaining amount of fuel from a required amount of fuel determined corresponding to a driver's demand and sets a result of the subtraction to the amount of fuel, which is to be injected next time into the intake port of the specific cylinder stopping in the intake stroke in the engine stop state.

In another preferable embodiment of the second engine start control apparatus of the invention, the fuel injection control module estimates the remaining amount of fuel unconsumed for the first combustion, based on at least one of a piston stop position of the specific cylinder stopping in the intake stroke in the engine stop state and an amount of fuel initially injected into the intake port of the specific cylinder. The piston stop position of the specific cylinder closer to the bottom dead center in the engine stop state generally tends to decrease the gas intake performance in the intake stroke and increase the remaining amount of fuel. The piston stop position may thus be used as a parameter correlated to the remaining amount of fuel. Under the condition of identical gas intake performance, the greater amount of fuel injection tends to increase the remaining amount of fuel. The amount of fuel initially injected into the intake port of the specific cylinder may thus be used as a parameter correlated to the remaining amount of fuel. The remaining amount of fuel may be estimated from a preset map with these parameters or according to a preset computational expression.

The present invention is also directed to a first engine start control method that controls, upon satisfaction of a preset engine restart condition in an engine stop state, to inject a fuel into an intake port of a specific cylinder stopping in an intake stroke, and to implement first combustion in the specific cylinder on a start of an engine. The first engine start control method includes the steps of: (a) detecting a piston stop position of the specific cylinder stopping in the intake stroke in the engine stop state; (b) determining whether the preset engine restart condition is satisfied in the engine stop state; and (c) upon determination of satisfaction of the preset engine restart condition by the step (c), specifying an amount of fuel, which is to be injected into the intake port of the specific cylinder stopping in the intake stroke, corresponding to the piston stop position detected by the step (a), and injecting the specified amount of fuel into the intake port of the specific cylinder.

Upon satisfaction of the preset engine restart condition, the first engine start control method of the invention specifies the amount of fuel, which is to be injected into the intake port of the specific cylinder stopping in the intake stroke, corresponding to the detected piston stop position of the specific cylinder, and injects the specified amount of fuel into the intake port of the cylinder. The amount of fuel injection is varied according to the piston stop position of the specific cylinder stopping in the intake stroke in the engine stop state. Increasing the amount of fuel injection under the condition of low gas intake performance of the specific cylinder desirably reduces a misfire rate at the time of ignition and thereby improves the startability of the engine. The first engine start control method may further include steps to perform functions of respective modules included in the first engine start control apparatus described above.

The present invention is also directed to a second engine start control method that controls, upon satisfaction of a preset engine restart condition in an engine stop state, to inject a fuel from a fuel into an intake port of a specific cylinder stopping in an intake stroke, and to implement first combustion in the specific cylinder on a start of an engine. The second engine start control method includes the steps of: (a) identifying whether the first combustion on the start of the engine results in a misfire; and (b) upon identification of a misfire by the step (a), estimating a remaining amount of fuel unconsumed for the first combustion, computing an amount of fuel, which is to be injected next time into the intake port of the specific cylinder stopping in the intake stroke in the engine stop state, from the estimated remaining amount of fuel, and injecting the computed amount of fuel into the intake port of the specific cylinder.

When the first combustion on the start of the engine results in a misfire, the second engine start control method of the invention estimates the remaining amount of fuel unconsumed for the first combustion, computes the amount of fuel, which is to be injected next time into the intake port of the specific cylinder stopping in the intake stroke in the engine stop state, from the estimated remaining amount of fuel, and injects the computed amount of fuel into the intake port of the specific cylinder. When the first combustion results in a misfire in the specific cylinder stopping in the intake stroke in the engine stop state, the cause of the misfire is assumed as insufficient introduction of the fuel injected in the intake port into the specific cylinder. On this assumption, the remaining amount of fuel that is not introduced into the specific cylinder but remains in the intake port is estimated. The amount of fuel to be injected next time into the intake port of the specific cylinder is computed from the estimated remaining amount of fuel. Such specification effectively restrains the air-fuel ratio from excessively being in a fuel rich condition and prevents poor emission. The second engine start control method may further include steps to perform functions of respective modules included in the second engine start control apparatus described above.

The present invention is further directed to a third engine start control apparatus that performs control, upon satisfaction of a preset engine restart condition in an engine stop state, to inject a fuel from a fuel injection unit, which is attached to a specific cylinder stopping in an intake stroke, into an intake port of the specific cylinder and to implement first combustion in the specific cylinder on a start of an engine. The third engine start control apparatus includes: an ignition unit that ignites an air-fuel mixture in each of multiple cylinders of the engine; a detection unit that detects a piston stop position of the specific cylinder stopping in the intake stroke in the engine stop state; an engine restart condition judgment module that determines whether the preset engine restart condition is satisfied in the engine stop state; and an ignition control module that, upon determination of satisfaction of the preset engine restart condition by the engine restart condition judgment module, specifies an ignition timing, which is to ignite the air-fuel mixture in the specific cylinder stopping in the intake stroke, corresponding to the piston stop position detected by the detection unit, and controls the ignition unit to ignite the air-fuel mixture in the specific cylinder at the specified ignition timing.

When the fuel is injected into the intake port of the specific cylinder stopping in the intake stroke upon satisfaction of the preset engine restart condition, the third engine start control apparatus varies the ignition timing, which is to ignite the air-fuel mixture in the specific cylinder, according to the detected piston stop position of the specific cylinder. The varying piston stop position of the specific cylinder varies the gas intake performance of the specific cylinder and thereby changes the state of the air-fuel mixture in the specific cylinder. Specification of the ignition timing based on the piston stop position of the specific cylinder desirably stabilizes the level of combustion torque generated on the start of the engine and thereby improves the drivability on the start of the engine.

In one preferable embodiment of the third engine start control apparatus of the invention, the ignition control module sets a fixed timing to the ignition timing, which is to ignite the air-fuel mixture in the specific cylinder stopping in the intake stroke, in the detected piston stop position between a top dead center and a predetermined middle position of the intake stroke, and advances the ignition timing from the fixed timing with a variation in detected piston stop position approaching from the predetermined middle position toward a bottom dead center. The gas intake performance of the specific cylinder at a start of engine cranking depends upon the piston stop position of the specific cylinder in the engine stop state. The third engine start control apparatus ignites the air-fuel mixture in the specific cylinder at the fixed ignition timing under the condition that the piston stop position suggests sufficient gas intake performance having high potential of producing the air-fuel mixture suitable for combustion, while igniting the air-fuel mixture in the specific cylinder at the earlier timing than the fixed ignition timing under the condition that the piston stop position suggest low gas intake performance having low potential of producing the air-fuel mixture suitable for combustion. Even under the condition of low gas intake performance having low potential of producing the air-fuel mixture suitable for combustion, the advanced ignition timing enables generation of a greater torque, compared with the fixed ignition timing. This arrangement thus stabilizes the level of combustion torque on the start of the engine with a variation in piston stop position of the specific cylinder stopping in the intake stroke.

The 'fixed timing' may be set arbitrarily and is, for example, a timing corresponding to a crank angle advanced from a top dead center of the compression stroke by 50 degrees or in a range around 50 degrees (for example, in a range of 40 to 60 degrees). The 'predetermined middle position' may be an empirically specified piston stop position where the specific cylinder stopping in the intake stroke has low gas intake performance and low potential of producing the air-fuel mixture suitable for combustion and is, for example, a piston stop position corresponding to a crank angle advanced from a top dead center of the intake stroke by 90 degrees or in a range around 90 degrees (for example, in a range of 80 to 100 degrees).

In another preferable embodiment of the third engine start control apparatus of the invention, the ignition control module advances the ignition timing, which is to ignite the air-fuel mixture in the specific cylinder stopping in the intake stroke, with a variation in detected piston stop position approaching from a top dead center toward a bottom dead center of the intake stroke. The gas intake performance is lowered as the piston stop position of the specific cylinder stopping in the intake stroke approaches toward the bottom dead center. This arrangement desirably stabilizes the level of combustion torque on the start of the engine even under the condition of low gas intake performance having low potential of producing the air-fuel mixture suitable for combustion.

In the third engine start control apparatus of the invention, the engine restart condition judgment module may determine satisfaction or dissatisfaction of the preset engine restart condition during a stop of the engine by idle stop control. Under the condition of low gas intake performance having low potential of producing the air-fuel mixture suitable for combustion.

In one concrete embodiment of the third engine start control apparatus, the detection unit includes a first crank angle sensor and a second crank angle sensor to measure a crank angle of the engine. The first crank angle sensor and the second crank angle sensor are arranged to discriminate a phase difference between output pulses of the first crank angle sensor and output pulses of the second crank angle sensor in reverse rotation of a crankshaft of the engine from a phase difference in normal rotation of the crankshaft. In the structure of this embodiment, the crank angle is detected from the output pulses of the first crank angle sensor. Normal rotation or reverse rotation of the crankshaft is identified according to the phase difference between the output pulses of the first crank angle sensor and the output pulses of the second crank angle sensor. In the normal rotation of the crankshaft, the pulse count is incremented in response to output of every one pulse from the first crank angle sensor. The crank angle is determined according to this incrementing pulse count. In the reverse rotation of the crankshaft, on the contrary, the pulse count is decremented in response to output of every one pulse from the first crank angle sensor. The crank angle is determined according to this decrementing pulse count. The accurate determination of the crank angle ensures accurate specification of the piston stop position.

The present invention is further directed to a third engine start control method that controls, upon satisfaction of a preset engine restart condition in an engine stop state, to inject a fuel into an intake port of a specific cylinder stopping in an intake stroke, and to implement first combustion in the specific cylinder on a start of an engine. The third engine start control method includes the steps of: (a) detecting a piston stop position of the specific cylinder stopping in the intake stroke in the engine stop state; (b) determining whether the preset engine restart condition is satisfied in the engine stop state; and (c) upon determination of satisfaction of the preset engine restart condition by the step (b), specifying an ignition timing, which is to ignite the air-fuel mixture in the specific cylinder stopping in the intake stroke, corresponding to the piston stop position detected by the step (a), and igniting the air-fuel mixture in the specific cylinder at the specified ignition timing.

When the fuel is injected into the intake port of the specific cylinder stopping in the intake stroke upon satisfaction of the preset engine restart condition, the third engine start control method varies the ignition timing, which is to ignite the air-fuel mixture in the specific cylinder, according to the detected piston stop position of the specific cylinder. The varying piston stop position of the specific cylinder varies the gas intake performance of the specific cylinder and thereby changes the state of the air-fuel mixture in the specific cylinder. Specification of the ignition timing based on the piston stop position of the specific cylinder desirably stabilizes the level of combustion torque generated on the start of the engine and thereby improves the drivability on the start of the engine. The third engine start control method may further include steps to perform functions of respective modules included in the third engine start control apparatus described above.

The present invention is still further directed to a vehicle with any of the engine start control apparatuses of the invention descried above. Thus, the vehicle of the invention realizes improved startability of the engine, prevents poor emission, or realizes stabilized level of combustion torque generated on the start of the engine and improved drivability on the start of the engine.

BEST MODES OF CARRYING OUT THE INVENTION

First Embodiment

Figure 1:
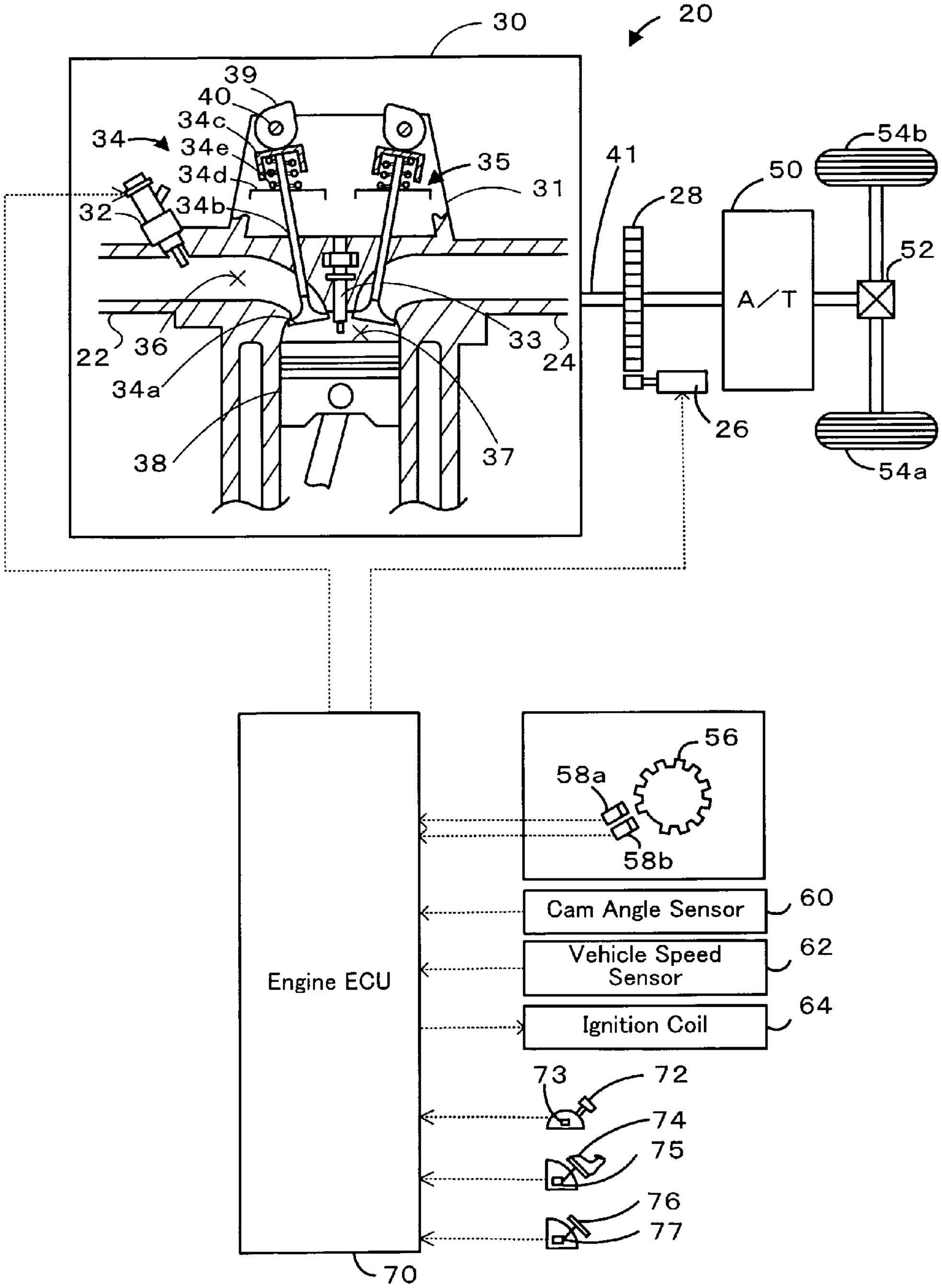
FIG. 1 schematically illustrates the configuration of a motor vehicle having idle stop function in a first embodiment of the invention.

A first embodiment of the invention is described below with reference to the accompanied drawings. FIG. 1 schematically illustrates the configuration of a motor vehicle 20 having idle stop function in the first embodiment of the invention. The motor vehicle 20 of the first embodiment with the idle stop function includes an engine 30 that is driven with a fuel, for example, gasoline, a starter motor 26 that starts the engine 30, and an engine electronic control unit 70 (hereafter referred to as engine ECU) that controls the operations of the respective constituents of the engine 30. In the engine 30, an injector 32 injects the fuel (gasoline) into an intake port 36 of each of multiple cylinders 31, and an ignition plug 33 ignites a mixture of the intake air and the injected fuel (air-fuel mixture) in each cylinder 31.

Figure 2:
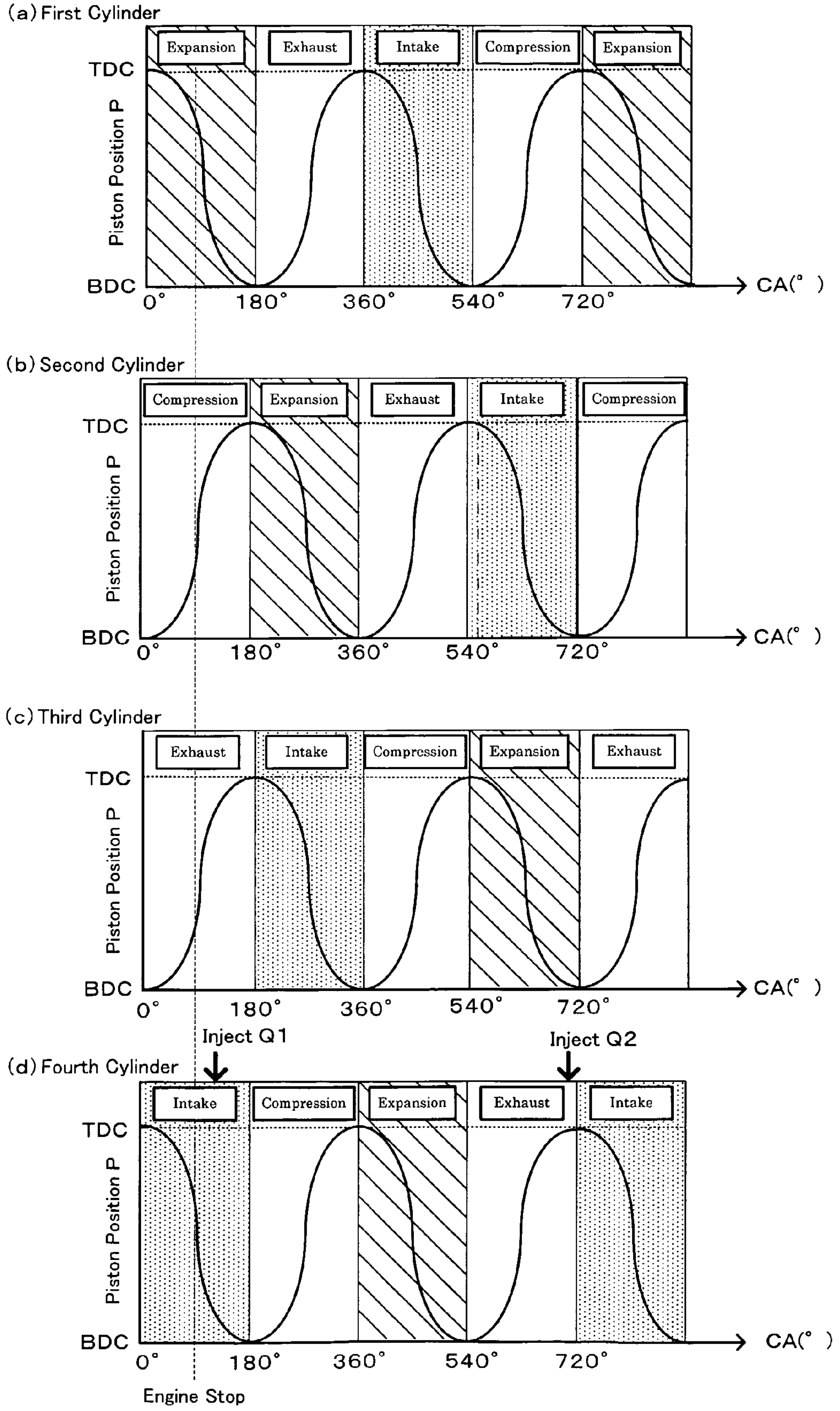
FIG. 2 is a map showing a variation in piston position P in four strokes of four cylinders against the crank angle CA.

The engine 30 is a 4-cylinder engine in this embodiment. Each of the four cylinders 31 is designed to have a port structure, where gasoline is injected by the injector 32 into the intake port 36 provided before an intake valve 34 in an intake conduit 22. The air taken into the intake conduit 22 via an air cleaner and a throttle valve (not shown) is mixed with the atomized gasoline injected by the injector 32 in the intake port 36 to the air-fuel mixture. The intake valve 34 is opened to introduce the air-fuel mixture into a combustion chamber 37. The introduced air-fuel mixture is ignited with spark of the ignition plug 33 to be explosively combusted. The combustion energy of the air-fuel mixture moves back and forth a piston 38 to rotate a crankshaft 41. An exhaust valve 35 is opened to discharge the exhaust gas after the combustion from the combustion chamber 37 to an exhaust conduit 24. The four cylinders 31 in the engine 30 sequentially repeat a cycle of an intake stroke, a compression stroke, an expansion stroke (combustion stroke), and an exhaust stroke. Two rotations of the crankshaft 41, that is, 720 degrees, correspond to one cycle. The ignition timing of the four cylinders 31 shifts in the order of a first cylinder, a second cylinder, a fourth cylinder, and a third cylinder in this embodiment. For example, when the first cylinder is in the expansion stroke, the second cylinder, the third cylinder, and the fourth cylinder are respectively in the compression stroke, the exhaust stroke, and the intake stroke. FIG. 2 is a map showing a variation in piston position P in the four strokes of the respective cylinders 31 against the crank angle CA. The ordinate of FIG. 2 represents the position P of the piston 38 in each of the cylinders 31. The symbols 'TDC' and 'BDC' respectively denote a top dead center and a bottom dead center.

A flywheel 28 is provided on one end of the crankshaft 41 of the engine 30 to be exposed outside the main body of the engine 30. The outer circumference of the flywheel 28 forms an external gear, which engages with an external gear formed on an edge of a rotating shaft of the starter motor 26 to start cranking at the time of engine start.

The intake valve 34 provided for each of the cylinders 31 of the engine 30 has a stem 34*b* with a tapered valve disc 34*a* on its lower end, a cylindrical lifter 34*c* joined with an upper end of the stem 34*b*, and a spring 34*e* that is located between the lifter 34*c* and a stay 34*d* of a cylinder head to press the lifter 34*c* apart from the stay 34*d*. The lifter 34*c* comes into contact with a cam face of an intake cam 39. The intake cam 39 is fixed to an intake cam shaft 40, which is linked to the crankshaft 41 by a timing belt (not shown) to have one rotation per two rotations of the crankshaft 41. The intake cam 39 rotates with axial rotation of the intake cam shaft 40, and the intake valve 34 is operated according to the state of the cam face of the rotating intake cam 39. When the cam face of the intake cam 39 does not press down the lifter 34*c*, the pressing force of the spring 34*a* keeps the intake valve 34 closed. When the cam face of the intake cam 39 presses down the lifter 34*c* against the pressing force of the spring 34*a*, the valve disc 34*a* is separated from the periphery of an intake port to open the intake valve 34. The exhaust valve 35 has the similar structure and the similar working mechanism to those of the intake valve 34 and is thus not specifically described here.

The crankshaft 41 of the engine 30 is linked to an automatic transmission 50. The automatic transmission 50 converts the power output from the engine 30 to the crankshaft 41 at a selected gear ratio and transmits the converted power via a differential gear 52 to drive wheels 54*a* and 54*b*. A timing rotor 56 is attached to the crankshaft 41 to rotate integrally with the crankshaft 41. A first crank angle sensor 58*a* and a second crank angle sensor 58*b* are located to face the timing rotor 56. The intake cams 39 used for opening and closing the respective intake valves 34 of the engine 30 are arrayed on the intake cam shaft 40. A timing rotor (not shown) is attached to the intake cam shaft 40 to rotate integrally with the intake cam shaft 40. A cam angle sensor 60 is located to face this timing rotor.

In the structure of this embodiment, the first crank angle sensor 58*a* and the second crank angle sensor 58*b* of the engine 30 are MRE rotation sensors having magnetic resistance elements. The first crank angle sensor 58*a* and the second crank angle sensor 58*b* are arranged such that output pulses of the first crank angle sensor 58*a* have an advanced phase of 2.5° from output pulses of the second crank angle sensor 58*b* in normal rotation of the crankshaft 41 and that output pulses of the first crank angle sensor 58*a* have a delayed phase of 2.5° from output pulses of the second crank angle sensor 58*b* in reverse rotation of the crankshaft 41. The timing rotor 56 has 34 teeth with two vacant tooth-spaces. During rotation of the crankshaft 41, the first crank angle sensor 58*a* outputs one pulse in response to approach of every tooth on the timing rotor 56, which rotates integrally with the crankshaft 41. Namely the first crank angle sensor 58*a* generates 34 pulses at every rotation (360 degrees) of the crankshaft 41. The number of the output pulses thus identifies the crank angle CA in the unit of 10 degrees and determines the rotation number Ne of the engine 30. A phase difference between the output pulses of the first crank angle sensor 58*a* and the output pulses of the second crank angle sensor 58*b* in the normal rotation of the crankshaft 41 is discriminable from a phase difference in the reverse rotation of the crankshaft 41. The normal rotation or the reverse rotation of the crankshaft 41 is thus identifiable according to the phase difference.

In the structure of this embodiment, the cam angle sensor 60 of the engine 30 is an electromagnetic pickup sensor. The cam angle sensor 60 is located to face the timing rotor with a set of teeth. The cam angle sensor 60 outputs one pulse in response to approach of every tooth on the timing rotor to the core of the cam angle sensor 60. Namely the cam angle sensor 60 outputs one pulse at every rotation of the intake cam shaft 40 (two rotations of the crankshaft 41). The cam angle sensor 60 may be arranged to come closest to the timing rotor when the piston 38 of the first cylinder reaches a top dead center of the expansion stroke. The cylinder 31 can thus be identified by the output pulses of the cam angle sensor 60 and the output pulses of the first crank angle sensor 58*a* and the second crank angle sensor 58*b*.

The engine ECU 70 controls the operations of the engine 30 and is constructed as a microprocessor (not shown) including a CPU, a ROM that stores processing programs and data, a RAM that temporarily stores data, input and output ports, and a communication port. The engine ECU 70 is connected with various sensors showing the operating conditions of the engine 30 and receives detection signals from these sensors via its input port. The sensors include the first crank angle sensor 58*a*, the second crank angle sensor 58*b*, the cam angle sensor 60, a vehicle speed sensor 62, and diversity of non-illustrated sensors, for example, an intake air temperature sensor that measures the temperature of the intake air, a throttle valve position sensor that measures the opening (position) of a throttle valve, and a water temperature sensor that measures the temperature of cooling water for the engine 30. The engine ECU 70 outputs, via its output port, driving signals to the starter motor 26 and the injector 32 and control signals to an ignition coil 64, which applies discharge voltage to the ignition plug 33. In order to make the engine 30 output a required power specified by the driver's operation, the engine ECU 70 also receives a gearshift position or a current setting position of a gearshift lever 72 from a gearshift position sensor 73, an accelerator pedal position or the driver's depression amount of an accelerator pedal 74 from an accelerator pedal position sensor 75, and a brake on-off signal representing the driver's depression or release of a brake pedal 76 from a brake pedal position sensor 77.

The description now regards the operations of the motor vehicle 20 of the embodiment having the idle stop function, especially a series of idle stop control. The motor vehicle 20 with the idle stop function executes idle stop control. The idle stop control automatically stops the engine 30 upon satisfaction of preset engine stop conditions, for example, the vehicle speed V equal to 0 in operation of the engine 30, the driver's depression of the brake pedal 76 to the brake-on state, and the engine rotation speed Ne of not higher than a preset low reference rotation speed. The idle stop control activates the starter motor 26 to automatically restart the engine 30 upon satisfaction of preset engine restart conditions, for example, the driver's release of the brake pedal 76 to the brake-off state. An automatic engine stop control routine and an automatic engine restart control routine are described below as the idle stop control.

Figure 3:
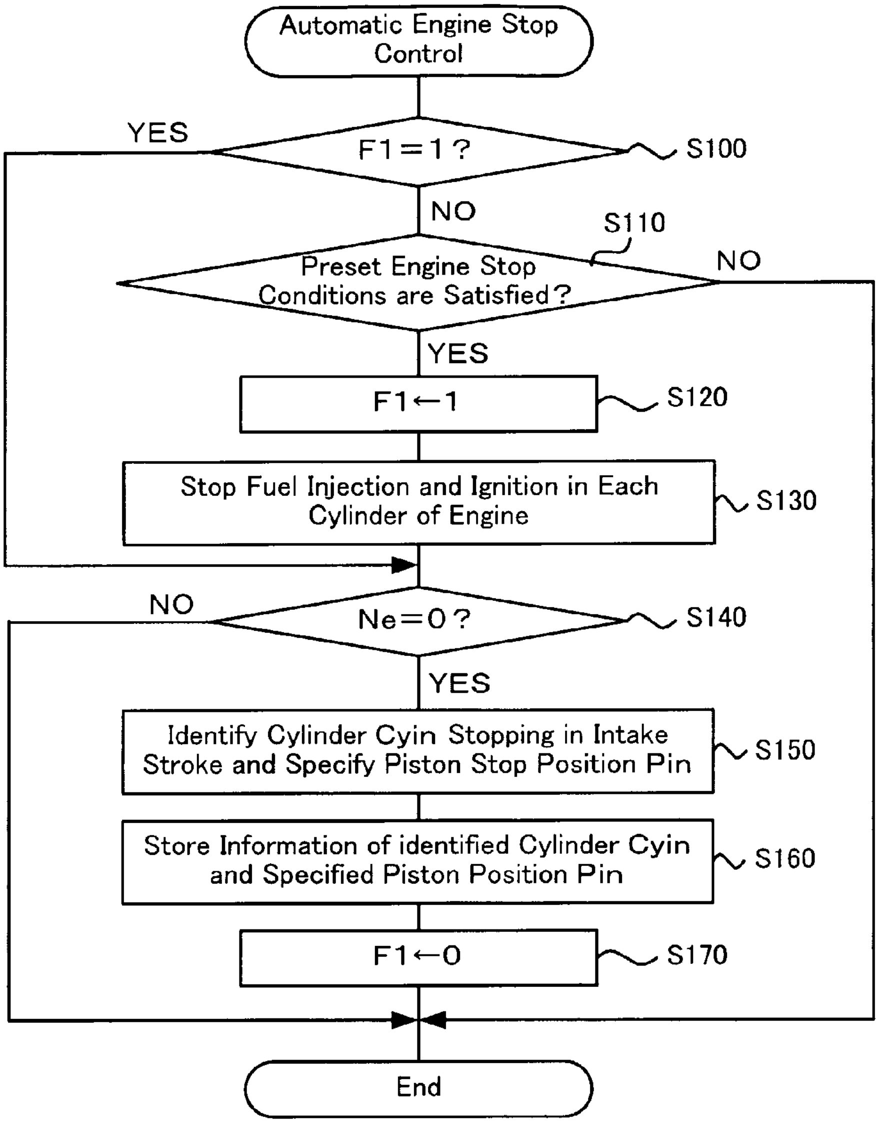
FIG. 3 is a flowchart showing an automatic engine stop control routine executed in the motor vehicle.

FIG. 3 is a flowchart showing the automatic engine stop control routine. This control routine is executed by the engine ECU 70 at preset time intervals (for example, at every several msec) during the operation of the engine 30. In the automatic engine stop control routine of FIG. 3, the engine ECU 70 first identifies whether a stop control execution flag F1 is equal to 1 (step S100). The stop control execution flag F1 equal to 0 represents that the engine ECU 70 is not currently executing the engine stop control, while the stop control execution flag F1 equal to 1 represents that the engine ECU 70 is currently executing the engine stop control. When the stop control execution flag F1 is identified as 0 at step S100, the engine ECU 70 determines whether the preset engine stop conditions are satisfied (step S110). The preset engine stop conditions are, for example, the vehicle speed V equal to 0 in operation of the engine 30, the driver's depression of the brake pedal 76 to the brake-on state, and the engine rotation speed Ne of not higher than a preset low reference rotation speed. The vehicle speed V is computed from output pulses of the vehicle speed sensor 62, which measures the rotation speed of the gear in the automatic transmission 50. The engine rotation speed Ne is computed from the time interval of the output pulses of the first crank angle sensor 58*a*. The low reference rotation speed is set to be slightly higher than the standard idling speed in this embodiment.

Upon dissatisfaction of the preset engine stop conditions at step S110, the engine ECU 70 immediately exits from this automatic engine stop control routine of FIG. 3 without any further processing. Upon satisfaction of the preset engine stop conditions at step S110, on the other hand, the engine ECU 70 sets the stop control execution flag F1 equal to 1 (step S120) and cuts off the power supply to the injector 32 in each of the cylinders 31 of the engine 30 and the power supply to the ignition coil 64 of the ignition plug 33 (step S130). The cutoff of the power supply stops fuel injection and ignition in each of the cylinders 31 of the engine 30. The engine 30 accordingly stops generation of a torque to rotate the crankshaft 41. Without the rotating torque, the crankshaft 41 rotates only by the inertial force, which is attenuated by the gas compression force produced in a cylinder in the compression stroke. The rotation of the crankshaft 41 is thus gradually slowed down to a full stop.

When the stop control execution flag F1 is identified as 1 at step S100 or after the cutoff of the power supply stops fuel injection and ignition in each of the cylinders 31 of the engine 30 at step S130, the engine ECU 70 determines whether the engine rotation speed Ne has decreased to zero (step S140). When the engine rotation speed Ne has not yet decreased to zero, the engine ECU 70 exits from the automatic engine stop control routine of FIG. 3 without any further processing. When the engine rotation speed Ne has decreased to zero, on the other hand, the engine ECU 70 identifies a cylinder Cyin stopping in the intake stroke and specifies a piston stop position Pin of the cylinder Cyin (step S150). The identification of the cylinder Cyin stopping in the intake stroke and the specification of the piston stop position Pin of the cylinder Cyin are based on the output pulses of the first crank angle sensor 58*a* and the second crank angle sensor 58*b* and the output pulses of the cam angle sensor 60. In the structure of this embodiment, each of the first crank angle sensor 58*a* and the second crank angle sensor 58*b* outputs one pulse by every 10 degrees of rotation of the crankshaft 41. The cam angle sensor 60 outputs one pulse every time the first cylinder enters the expansion stroke. When the output timing of one pulse from the cam angle sensor 60 is set to a crank angle of 0 degree, the piston stop position Pin of the cylinder Cyin is specified corresponding to the computed crank angle CA, which varies in a range of 0 to 720 degrees. The concrete procedure identifies the normal rotation or the reverse rotation of the crankshaft 41 based on a phase difference between the output pulses of the first crank angle sensor 58*a* and the output pulses of the second crank angle sensor 58*b*. In the normal rotation of the crankshaft 41, the procedure increments the pulse count in response to output of everyone pulse from the first crank angle sensor 58*a* and computes the crank angle CA according to the incrementing pulse count. In the reverse rotation of the crankshaft 41, on the contrary, the procedure decrements the pulse count in response to output of every one pulse from the first crank angle sensor 58*a* and computes the crank angle CA according to the decrementing pulse count. The procedure refers to the map of FIG. 2 showing the variation in piston position P in the strokes of the respective cylinders 31 against the crank angle CA to identify the cylinder Cyin stopping in the intake stroke and specify the piston stop position Pin of the cylinder Cyin corresponding to the computed crank angle CA.

The engine ECU 70 stores information representing the identified cylinder Cyin stopping in the intake stroke and the specified piston stop position Pin of the cylinder Cyin into a backup RAM (not shown) (step S160). The engine ECU 70 then resets the stop control execution flag F1 to 0 (step S170) and terminates the automatic engine stop control routine of FIG. 3. According to the above procedure, the idle stop control identifies the cylinder Cyin stopping in the intake stroke and specifies the piston stop position Pin of the cylinder Cyin when the engine 30 stops.

Figure 4:
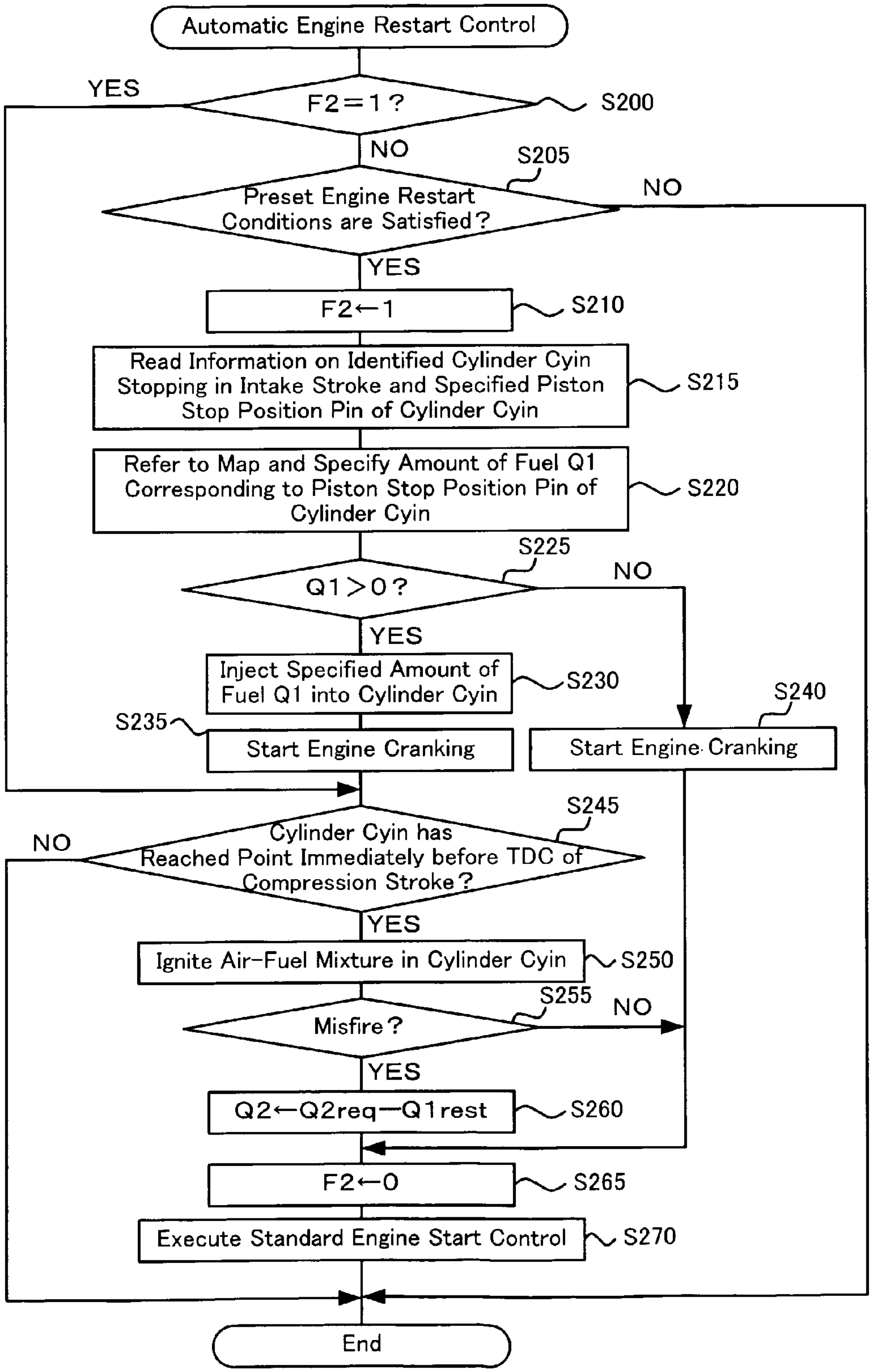
FIG. 4 is a flowchart showing an automatic engine restart control routine executed in the motor vehicle of the first embodiment.

FIG. 4 is a flowchart showing the automatic engine restart control routine. This control routine is executed by the engine ECU 70 at preset time intervals (for example, at every several msec) after an automatic stop of the engine 30 by the automatic engine stop control routine of FIG. 3. In the automatic engine restart control routine of FIG. 4, the engine ECU 70 first identifies whether a fuel injection control execution flag F2 is equal to 1 (step S200). The fuel injection control execution flag F2 equal to 0 represents that the engine ECU 70 is not currently executing the automatic engine restart control routine of FIG. 4, while the fuel injection control execution flag F2 equal to 1 represents that the engine ECU 70 is currently executing the automatic engine restart control routine of FIG. 4. When the fuel injection control execution flag F2 is identified as 0 at step S200, the engine ECU 70 determines whether the preset engine restart conditions are satisfied (step S205). The preset engine restart conditions include, for example, the driver's release of the brake pedal 76 to change the brake pedal position detected by the brake position sensor 77 to the brake-off state during an auto stop of the engine 30.

Figure 5:
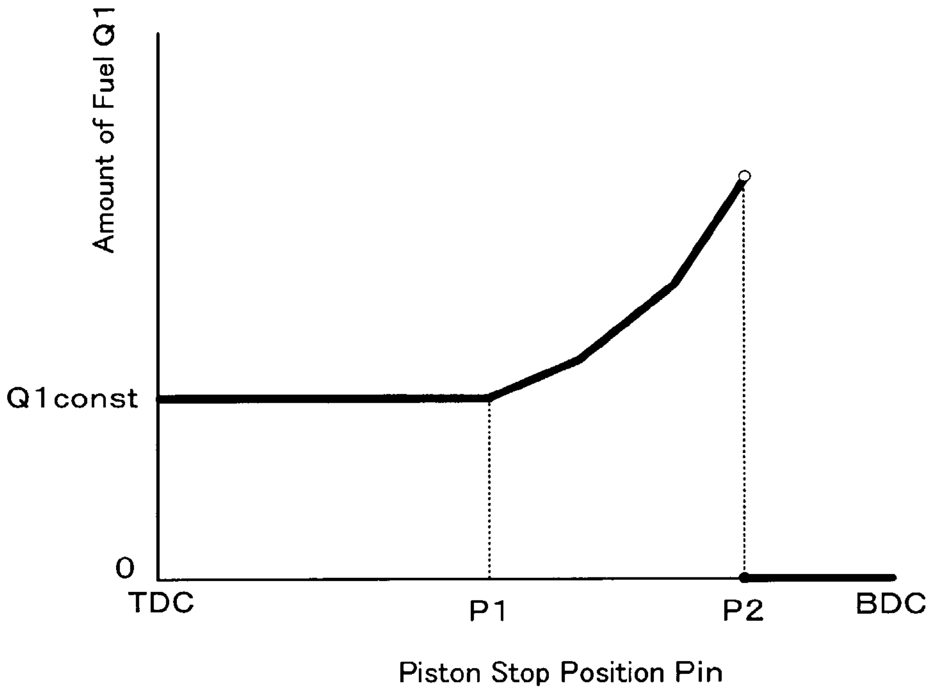
FIG. 5 is a map showing a variation in amount of fuel Q1 to be injected into a cylinder Cyin against the piston stop position Pin of the cylinder Cyin.

Upon dissatisfaction of the preset engine restart conditions at step S205, the engine ECU 70 immediately exits from the automatic engine restart control routine of FIG. 4 without any further processing. Upon satisfaction of the preset engine restart conditions at step S205, on the other hand, the engine ECU 70 sets the fuel injection control execution flag F2 equal to 1 (step S210) and reads the information representing the identified cylinder Cyin stopping in the intake stroke and the specified piston stop position Pin of the cylinder Cyin from the backup RAM (not shown) (step S215). The engine ECU 70 then refers to a preset map stored in a ROM (not shown) and specifies an amount of fuel Q1 to be injected into the cylinder Cyin stopping in the intake stroke corresponding to the piston stop position Pin of the cylinder Cyin read at step S215 (step S220). FIG. 5 is a map showing a variation in amount of fuel Q1 to be injected into the cylinder Cyin stopping in the intake stroke against the piston stop position Pin of the cylinder Cyin. As shown in the map of FIG. 5, the amount of fuel Q1 is fixed to a preset constant value Q1*const* in the piston stop position Pin from a top dead center of the intake stroke to a predetermined middle position P1. The amount of fuel Q1 increases with a variation in piston stop position Pin approaching from the predetermined middle position P1 to a predetermined BDC-nearby position P2 before a bottom dead center (BDC). The amount of fuel Q1 is fixed to 0 in the piston stop position Pin from the predetermined BDC-nearby position P2 to the bottom dead center. In this embodiment, the piston stop position Pin corresponding to the crank angle CA of 120 degrees over the top dead center of the intake stroke is set to the middle position P1, and the piston stop position Pin corresponding to the crank angle CA of 160 degrees over the top dead center of the intake stroke is set to the BDC-nearby position P2. The engine ECU 70 determines whether the amount of fuel Q1 specified at step S220 to be injected into the cylinder Cyin stopping in the intake stroke is greater than zero (step S225). When the amount of fuel Q1 specified at step S220 is greater than zero at step S225, the engine ECU 70 instructs the injector 32 to inject the specified amount of fuel Q1 into the cylinder Cyin stopping in the intake stroke (step S230). The fuel injected from the injector 32 is mixed with the air in the intake port 36 to the air-fuel mixture. The non-combusted air-fuel mixture is thus prepared and kept in the intake port 36 of the cylinder Cyin, while the piston stop position Pin of the cylinder Cyin stopping in the intake stroke is between the top dead center and the predetermined BDC-nearby position P2.

The engine ECU 70 then protrudes the rotating shaft of the starter motor 26 to make the external gear formed on the edge of the rotating shaft engage with the external gear formed on the outer circumference of the flywheel 28, and starts the power supply to the starter motor 26 (step S235). The engagement of the external gear on the flywheel 28 with the external gear on the edge of the rotating shaft of the starter motor 26 rotates the flywheel 28 with the rotation of the starter motor 26. The rotational force of the flywheel 26 rotates the crankshaft 41 and starts cranking the engine 30. The air-fuel mixture in the intake port 36 of the cylinder Cyin is then introduced via the intake valve 34 into the combustion chamber 37 by the negative pressure produced by the down motion of the piston 38 in the cylinder Cyin.

When the specified amount of fuel Q1 to be injected into the cylinder Cyin stopping in the intake stroke is equal to zero at step S225, the engine ECU 70 activates the starter motor 26 to start cranking the engine 30 without fuel injection into the cylinder Cyin (step S240) and resets the fuel injection control execution flag F2 to zero (step S265). The engine ECU 70 subsequently executes standard engine start control (step S270) and exits from the automatic engine restart control routine of FIG. 4. The standard engine start control regulates the fuel injection and the ignition with cranking the engine 30 by the starter motor 26 until complete explosive combustion of the air-fuel mixture in the engine 30.

Upon identification of the fuel injection control execution flag F2 equal to 1 at step S200 or after a start of cranking the engine 30 at step S235, the engine ECU 70 determines whether the piston 38 in the cylinder Cyin has reached a point immediately before a top dead center (TDC) of the compression stroke (step S245). When the piston 38 in the cylinder Cyin has not yet reached the point immediately before the top dead center of the compression stroke, the engine ECU 70 exits from the automatic engine restart control routine of FIG. 4 without any further processing. When the piston 38 in the cylinder Cyin has reached the point immediately before the top dead center of the compression stroke, on the other hand, the engine ECU 70 applies discharge voltage to the ignition plug 33 of the cylinder Cyin to generate a spark (step S250). The air-fuel mixture in the combustion chamber 37 of the cylinder Cyin is ignited and combusted by the spark of the ignition plug 33. The piston 38 in the cylinder Cyin is pressed toward a bottom dead center of the expansion stroke, and the crankshaft 41 rotates normally with the motion of the piston 38.

The engine ECU 70 then determines whether the ignition of the air-fuel mixture with the spark at step S250 results in a misfire (step S255). In this embodiment, the identification of a misfire is based on the computed engine rotation speed Ne at the time interval of the output pulse of the first crank angle sensor 58*a*. More specifically, the identification of a misfire is based on determination of whether the engine rotation speed Ne has reached a preset threshold value Neth on completion of a first expansion stroke of the cylinder Cyin. The engine rotation speed Ne that has reached the preset threshold value Neth suggests no misfire, whereas the engine rotation speed Ne that has not reached the preset threshold value Neth suggests a misfire. The amount of fuel Q1 read from the map at step S220 to be injected into the intake port 36 of the cylinder Cyin stopping in the intake stroke increases under the condition of the low gas intake performance, which depends upon the piston stop position Pin of the cylinder Cyin. The amount of fuel Q1 thus specified is actually injected into the cylinder Cyin stopping in the intake stroke at step S230. Such regulation of the fuel injection facilitates introduction of the fuel from the intake port 36 into the combustion chamber 37 even under the condition of the low gas intake performance of the cylinder Cyin, which depends upon the piston stop position Pin of the cylinder Cyin. The regulation of the fuel injection thus desirably reduces the misfire rate at the ignition of the air-fuel mixture with the spark at step S250.

Figure 6:
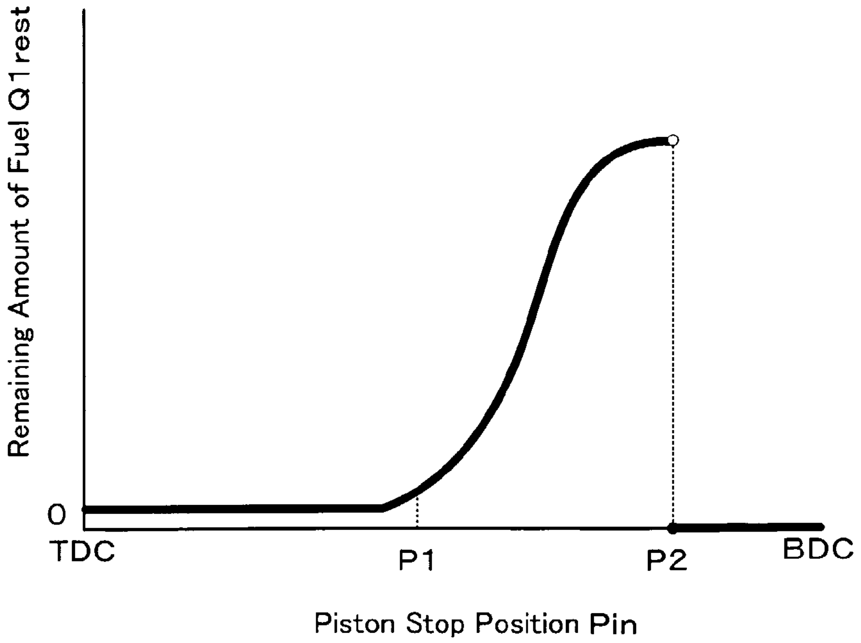
FIG. 6 is a map showing a variation in remaining amount of fuel Q1rest unconsumed for first combustion against the piston stop position Pin of the cylinder Cyin.

In the event of identification of a misfire at step S255, the engine ECU 70 subtracts a remaining amount of fuel Q1rest unconsumed for the first combustion from a required amount of fuel Q2*req* representing the driver's demand and sets a result of the subtraction to an amount of fuel Q2 to be injected next time into the intake port 36 of the cylinder Cyin (step S260). The remaining amount of fuel Q1rest unconsumed for the first combustion is estimated on the assumption that the misfire is caused by insufficient introduction of the fuel injected in the intake port 36 into the combustion chamber 37 of the cylinder Cyin. The concrete procedure refers to a preset map stored in the ROM (not shown) and specifies the remaining amount of fuel Q1rest corresponding to the piston stop position Pin of the cylinder Cyin in an engine stop state. FIG. 6 is a map showing a variation in remaining amount of fuel Q1rest against the piston stop position Pin of the cylinder Cyin. The remaining amount of fuel Q1rest depends upon the piston stop position Pin of the cylinder Cyin in the engine stop state and the amount of fuel Q1 initially injected into the intake port 36 of the cylinder Cyin. As shown in the map of FIG. 6, the cylinder Cyin has sufficient gas intake performance in the piston stop position Pin from the top dead center to the predetermined middle position P1. As shown in the map of FIG. 5, the amount of fuel Q1 initially injected into the intake port 36 of the cylinder Cyin in this range of the piston stop position Pin is fixed to the preset constant value Q1*const*. The remaining amount of fuel Q1rest is thus equal to zero or is only slightly greater than zero. The gas intake performance of the cylinder Cyin gradually decreases with a variation in piston stop position Pin from the predetermined middle position P1 to the predetermined BDC-nearby position P2 as shown in the map of FIG. 6. The amount of fuel Q1 initially injected into the intake port 36 of the cylinder Cyin gradually increases from the preset constant value Q1*const* with the variation in piston stop position Pin from the predetermined middle position P1 to the predetermined BDC-nearby position P2 as shown in the map of FIG. 5. The remaining amount of fuel Q1rest thus increases with the variation in piston stop position Pin from the predetermined middle position P1 to the predetermined BDC-nearby position P2.

After setting the amount of fuel Q2 to be injected next time into the intake port 36 of the cylinder Cyin at step S260 or upon identification of no misfire at step S255, the engine ECU 70 resets the fuel injection control execution flag F2 to zero (step S265) and executes the standard engine start control (step S270), before terminating the automatic engine restart control routine of FIG. 4. On completion of this automatic engine restart control after the standard engine start control at step S270, the engine ECU 70 returns the protruded rotating shaft of the starter motor 26 to its original position, inactivates the starter motor 26 to stop cranking the engine 30, and executes standard drive control.

The injector 32 of this embodiment corresponds to the fuel injection unit of the invention. The first crank angle sensor 58*a*, the second crank angle sensor 58*b*, and the cam angle sensor 60 of the embodiment correspond to the detection unit of the invention. The engine ECU 70 of the embodiment is equivalent to the engine restart condition judgment module, the fuel injection control module, and the misfire identification module of the invention. The embodiment describes the operations of the motor vehicle 20 with the idle stop function to clarify the engine start control apparatus and the engine start control method of the invention.

In the motor vehicle 20 of the embodiment with the idle stop function, upon satisfaction of the preset engine restart conditions of idle stop control, the automatic engine restart control of FIG. 4 specifies the amount of fuel Q1, which is to be injected into the intake port 36 of the cylinder Cyin stopping in the intake stroke, corresponding to the piston stop position Pin of the cylinder Cyin and actually injects the specified amount of fuel Q1 into the intake port 36 of the cylinder Cyin. The automatic engine restart control increases the amount of fuel Q1 under the condition of the low gas intake performance where the piston stop position Pin of the cylinder Cyin stopping in the intake stroke in the engine stop state is between the predetermined middle position P1 and the predetermined BDC-nearby position P2 of the intake stroke. Such regulation of the fuel injection desirably reduces the misfire rate at the timing of first ignition of the air-fuel mixture for combustion and thereby improves the startability of the engine 30.

The automatic engine restart control of FIG. 4 sets the amount of fuel Q1 to be injected into the cylinder Cyin to zero in the piston stop position Pin of the cylinder Cyin from the predetermined BDC-nearby position P2 to the bottom dad center of the intake stroke. Under the condition of the low gas intake performance due to the piston stop position Pin of the cylinder Cyin stopping in the intake stroke, the increased fuel injection may not attain sufficient introduction of the fuel into the combustion chamber 37. In such cases, discontinuation of fuel injection into the cylinder Cyin stopping in the intake stroke desirably prevents the poor emission.

In the event of identification of a misfire at the timing of first ignition of the air-fuel mixture for combustion to restart the engine 30, the automatic engine restart control of FIG. 4 reads the remaining amount of fuel Q1rest unconsumed for the first combustion from the preset map and subtracts the remaining amount of fuel Q1rest from the required amount of fuel Q2*req* representing the driver's demand. The result of the subtraction is set to the amount of fuel Q2 to be injected next time into the intake port 36 of the cylinder Cyin. Such regulation of the fuel injection effectively restrains the air-fuel ratio of the air-fuel mixture from being in an excessively fuel rich condition and thus prevents the poor emission.

The piston stop position Pin of the cylinder Cyin is specified from the output pulses of the first crank angle sensor 58*a* and the output pulses of the second crank angle sensor 58*b*. The use of the two crank angle sensors 58*a* and 58*b* ensures the accurate specification of the piston stop position Pin, compared with specification with only one crank angle sensor.

The idle stop control repeats the automatic engine stop and the automatic engine restart many times during drive of the motor vehicle 20 and accordingly has high demand for improving the startability of the engine 30. The automatic engine restart control of the embodiment desirably meets this demand.

Second Embodiment

A second embodiment of the invention regards the motor vehicle 20 with the idle stop function, which has the same configurations as those of the first embodiment. The like elements to those of the first embodiment are thus expressed by the like numerals and symbols. The primary difference from the first embodiment is automatic engine restart control. The motor vehicle 20 of the second embodiment with the idle stop function executes the automatic engine stop control of FIG. 3 in the same manner as the first embodiment. The ignition plug 33 of this embodiment corresponds to the ignition unit of the invention, and the engine ECU 70 is equivalent to the ignition control module of the invention.

Figure 7:
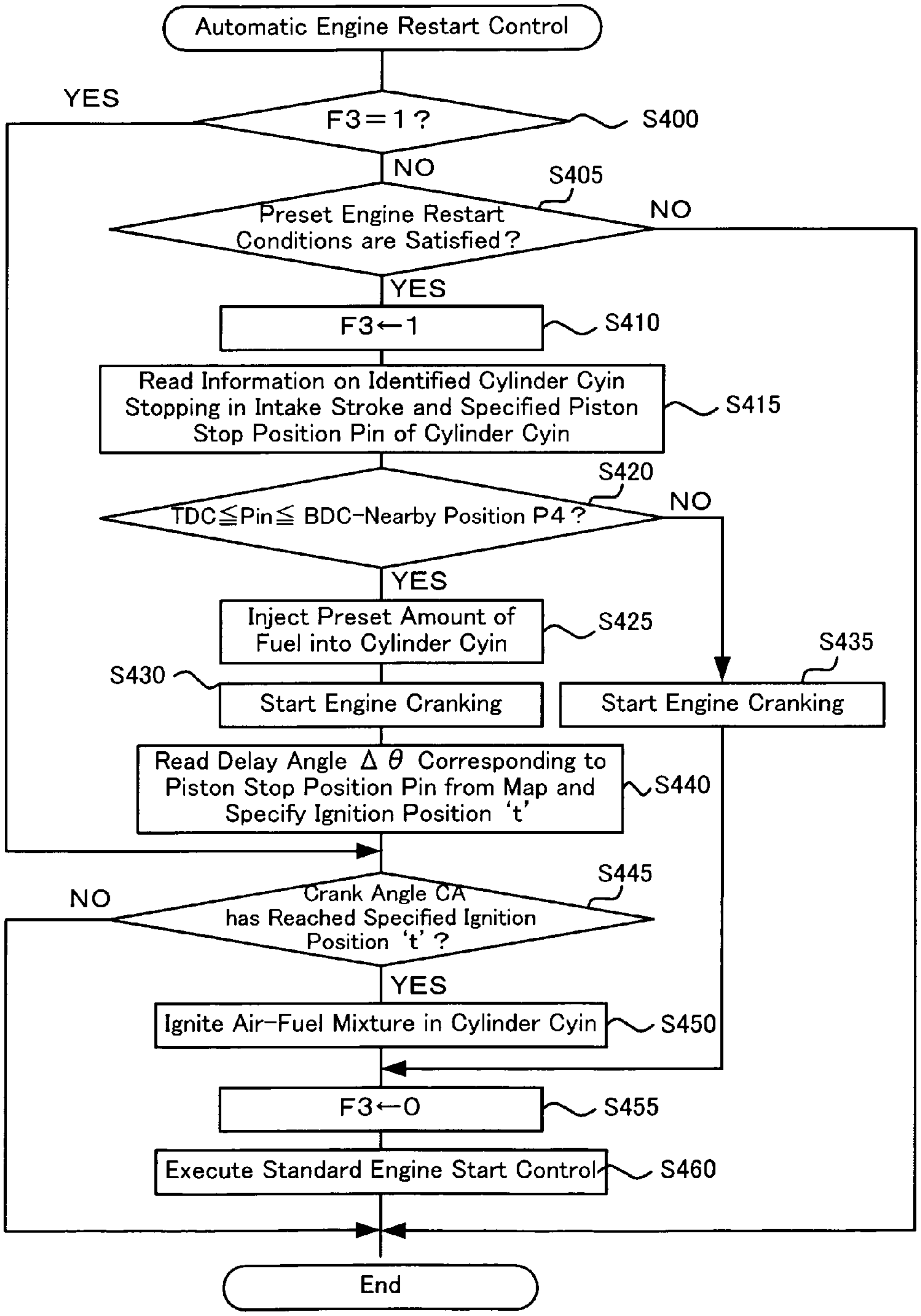
FIG. 7 is a flowchart showing an automatic engine restart control routine executed in a second embodiment of the invention.

FIG. 7 is a flowchart showing an automatic engine restart control routine of the second embodiment. This control routine is executed by the engine ECU 70 at preset time intervals (for example, at every several msec) after an automatic stop of the engine 30 by the automatic engine stop control routine of FIG. 3. In the automatic engine restart control routine of FIG. 7, the engine ECU 70 first identifies whether an ignition control execution flag F3 is equal to 1 (step S400). The ignition control execution flag F3 equal to 0 represents that the engine ECU 70 is not currently executing the automatic engine restart control routine of FIG. 7, while the ignition control execution flag F3 equal to 1 represents that the engine ECU 70 is currently executing the automatic engine restart control routine of FIG. 7. When the ignition control execution flag F3 is identified as 0 at step S400, the engine ECU 70 determines whether the preset engine restart conditions are satisfied (step S405). The preset engine restart conditions include, for example, the driver's release of the brake pedal 76 to change the brake pedal position detected by the brake position sensor 77 to the brake-off state during an auto stop of the engine 30.

Upon dissatisfaction of the preset engine restart conditions at step S405, the engine ECU 70 immediately exits from the automatic engine restart control routine of FIG. 7 without any further processing. Upon satisfaction of the preset engine restart conditions at step S405, on the other hand, the engine ECU 70 sets the ignition control execution flag F3 equal to 1 (step S410) and reads the information representing the identified cylinder Cyin stopping in the intake stroke and the specified piston stop position Pin of the cylinder Cyin from the backup RAM (not shown) (step S415). The engine ECU 70 then determines whether the piston stop position Pin read at step S415 is located between a top dead center (TDC) of the intake stroke and a predetermined BDC-nearby position P4 immediately before a bottom dead center (BDC) (step S420). In this embodiment, the piston stop position Pin corresponding to the crank angle CA of 160 degrees over the top dead center of the intake stroke is set to the BDC-nearby position P4. When the piston stop position Pin is located between the top dead center and the predetermined BDC-nearby position P4 of the intake stroke at step S420, the engine ECU 70 instructs the injector 32 to inject a preset amount of fuel into the intake port 36 of the cylinder Cyin stopping in the intake stroke (step S425). The fuel injected from the injector 32 is mixed with the air in the intake port 36 to the air-fuel mixture. The non-combusted air-fuel mixture is thus prepared and kept in the intake port 36 of the cylinder Cyin stopping in the intake stroke.

The engine ECU 70 then protrudes the rotating shaft of the starter motor 26 to make the external gear formed on the edge of the rotating shaft engage with the external gear formed on the outer circumference of the flywheel 28, and starts the power supply to the starter motor 26 (step S430). The engagement of the external gear on the flywheel 28 with the external gear on the edge of the rotating shaft of the starter motor 26 rotates the flywheel 28 with the rotation of the starter motor 26. The rotational force of the flywheel 26 rotates the crankshaft 41 and starts cranking the engine 30. The air-fuel mixture in the intake port 36 of the cylinder Cyin is then introduced via the intake valve 34 into the combustion chamber 37 by the negative pressure produced by the down motion of the piston 38 in the cylinder Cyin.

When the piston stop position Pin is located between the predetermined BDC-nearby position P4 and the bottom dead center of the intake stroke at step S420, on the other hand, the engine ECU 70 activates the starter motor 26 to rotate the crankshaft 41 and start cranking the engine 30 without fuel injection into the intake port 36 of the cylinder Cyin stopping in the intake stroke (step S435) and resets the ignition control execution flag F3 to zero (step S455). The engine ECU 70 subsequently executes standard engine start control (step S460) and exits from the automatic engine restart control routine of FIG. 7. The standard engine start control regulates the fuel injection and the ignition with cranking the engine 30 by the starter motor 26 until complete explosive combustion of the air-fuel mixture in the engine 30. The piston stop position Pin between the predetermined BDC-nearby position P4 and the bottom dead center of the intake stroke causes insufficient introduction of the air-fuel mixture into the combustion chamber 37. In such cases, the automatic engine restart control discontinues fuel injection into the intake port 36 of the cylinder Cyin.

Figure 8:
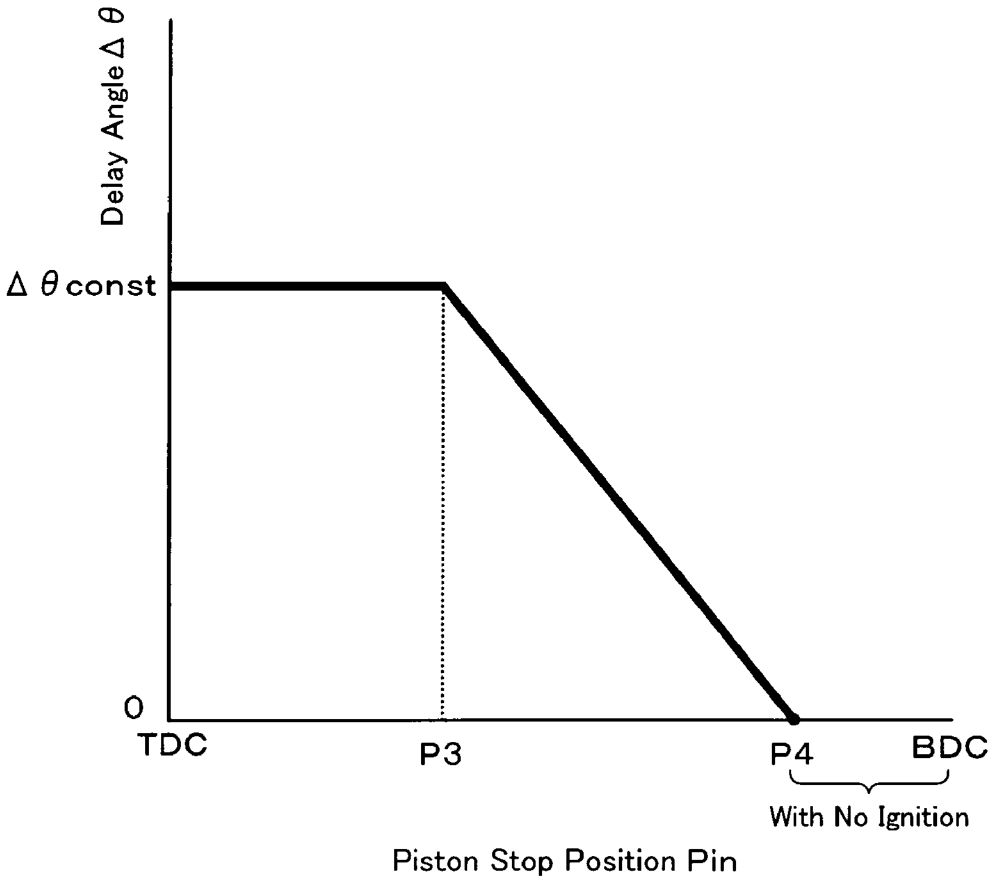
FIG. 8 is a map showing a variation in delay angle Δθ to delay an ignition position in the cylinder Cyin against the piston stop position Pin of the cylinder Cyin.

After a start of cranking the engine 30 at step S430, the engine ECU 70 reads a delay angle Δθ to delay an ignition position 't' of the air-fuel mixture in the cylinder Cyin from a preset reference ignition position 'tb', from a preset map stored in the ROM (not shown) and specifies the ignition position 't' of the cylinder Cyin (step S440). The reference ignition position 'tb' is specified by a crank angle CA immediately before the cylinder Cyin reaches a top dead center of the compression stroke. In this embodiment, the reference ignition position 'tb' is the ignition position 't' corresponding to the predetermined BDC-nearby position P4 having the minimum gas intake performance of the cylinder Cyin in the piston stop position Pin between the top dead center and the predetermined BDC-nearby position P4 of the intake stroke. FIG. 8 is a map showing a variation in delay angle Δθ against the piston stop position Pin of the cylinder Cyin. As shown in the map of FIG. 8, in the piston stop position Pin of the cylinder Cyin from the top dead center (TDC) to a predetermined middle position P3, the delay angle Δθ is fixed to a preset constant value Δθconst, which attains a maximum delay of the ignition position 't' from the preset reference ignition position 'tb'. The delay angle Δθ gradually decreases to give a smaller delay to the ignition position 't' with a variation in piston stop position Pin of the cylinder Cyin approaching from the predetermined middle position P3 to the predetermined BDC-nearby position P4. In this embodiment, the piston stop position Pin corresponding to the crank angle CA of 120 degrees over the top dead center of the intake stroke is set to the middle position P3, and the crank angle CA of about 50 degrees over a top dead center of the compression stroke is set to the constant delay angle Δθconst. In the piston stop position Pin between the predetermined BDC-nearby position P4 and the bottom dead center, there is no ignition since the fuel injection into the intake port 36 of the cylinder Cyin is discontinued.

Upon identification of the ignition control execution flag F3 equal to 1 at step S400 or after the specification of the ignition position 't' at step S440, the engine ECU 70 determines whether the crank angle CA has reached the specified ignition position 't' (step S445). When the crank angle CA has not yet reached the specified ignition position 't' at step S445, the engine ECU 70 exits from the automatic engine restart control routine of FIG. 7 without any further processing. The crank angle CA is detected from the output pulses of the first crank angle sensor 58*a*, the output pulses of the second crank angle sensor 58*b*, and the output pulses of the cam angle sensor 60. When the crank angle CA has reached the specified ignition position 't' at step S445, on the other hand, the engine ECU 70 applies discharge voltage to the ignition plug 33 of the cylinder Cyin to generate a spark (step S450). The air-fuel mixture in the combustion chamber 37 of the cylinder Cyin is ignited and combusted by the spark of the ignition plug 33. The piston 38 in the cylinder Cyin is pressed toward a bottom dead center of the expansion stroke, and the crankshaft 41 rotates normally with the motion of the piston 38. The air-fuel mixture in the cylinder Cyin is ignited at the preset reference ignition position 'tb' when the piston stop position Pin in the engine stop state is the predetermined BDC-nearby position P4. The air-fuel mixture in the cylinder Cyin is ignited at the ignition position 't' delayed from the preset reference ignition position 'tb' when the piston stop position Pin in the engine stop state is between the top dead center and the predetermined BDC-nearby position P4 as shown in the map of FIG. 8. Under the condition that the piston stop position Pin suggests sufficient gas intake performance having high potential of producing the air-fuel mixture suitable for combustion, the ignition is performed when the crank angle CA reaches an ignition position 't' delayed from the preset reference ignition position 'tb' by the constant delay angle Δθconst. Under the condition that the piston stop position Pin suggests low gas intake performance having low potential of producing the air-fuel mixture suitable for combustion, on the contrary, the ignition is performed at the earlier timing by gradually decreasing the delay angle Δθ from the preset constant delay angle Δθconst. The automatic engine restart control of this embodiment sets the earlier ignition timing to produce the greater combustion torque under the condition of low gas intake performance having low potential of producing the air-fuel mixture suitable for combustion, compared with the ignition timing under the condition of high gas intake performance. Such setting desirably regulates the combustion torque to a substantially constant level over the varying piston stop position Pin and thereby stabilizes the level of combustion torque on a start of the engine 30. The engine ECU 70 subsequently resets the ignition control execution flag F3 to zero (step S455) and executes the standard engine start control (step S460), before terminating the automatic engine restart control routine of FIG. 7. On completion of this automatic engine restart control after the standard engine start control at step S460, the engine ECU 70 returns the protruded rotating shaft of the starter motor 26 to its original position, inactivates the starter motor 26 to stop cranking the engine 30, and executes standard drive control.

In the motor vehicle 20 of the second embodiment with the idle stop function, upon satisfaction of the preset engine restart conditions of idle stop control, the automatic engine restart control of FIG. 7 specifies the ignition position 't' to ignite the air-fuel mixture in the cylinder Cyin corresponding to the piston stop position Pin in an engine stop state and actually ignites the air-fuel mixture at the specified ignition position 't'. In the piston stop position Pin of the cylinder Cyin between the predetermined middle position P3 and the predetermined BDC-nearby position P4 of the intake stroke, the cylinder Cyin has low gas intake performance having low potential of producing the air-fuel mixture suitable for combustion. The ignition position 't' under the condition of low gas intake performance has a smaller delay from the preset reference ignition position 'tb' than the ignition position 't' under the condition of high gas intake performance. Such control desirably stabilizes the level of combustion torque on a start of the engine 30 and thus improves the drivability on the start of the engine 30.

The crank angle CA and the piston stop position Pin of the cylinder Cyin are specified from the output pulses of the first crank angle sensor 58*a* and the output pulses of the second crank angle sensor 58*b*. The use of the two crank angle sensors 58*a* and 58*b* ensures the accurate specification of the piston stop position Pin, compared with specification with only one crank angle sensor.

The idle stop control repeats the automatic engine stop and the automatic engine restart many times during drive of the motor vehicle 20 and accordingly has high demand for improving the drivability on a start of the engine 30. The automatic engine restart control of this embodiment desirably meets this demand.

MODIFICATIONS

The embodiments discussed above are to be considered in all aspects as illustrative and not restrictive. There may be many modifications, changes, and alterations without departing from the scope or spirit of the main characteristics of the present invention.

Figure 9:
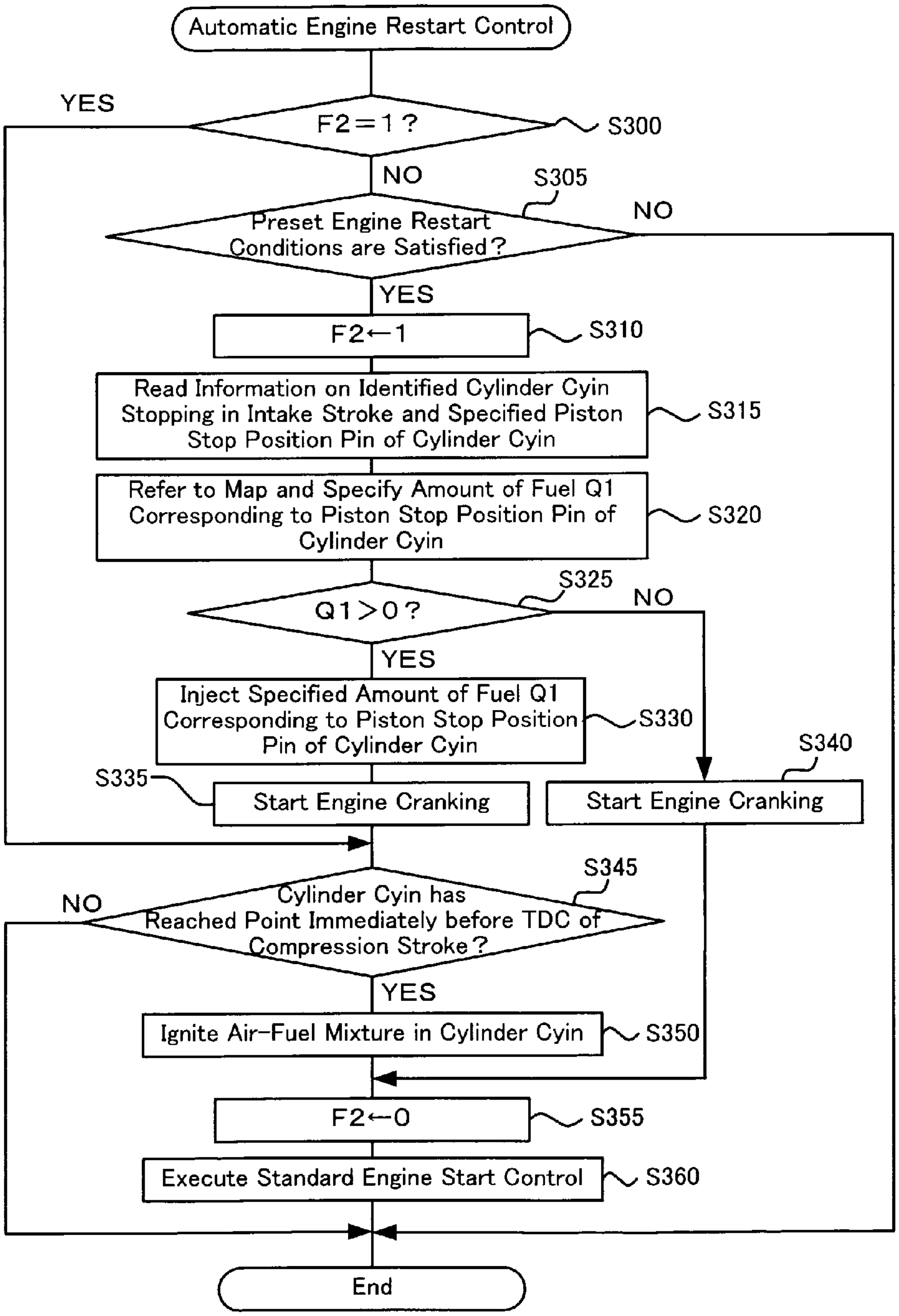
FIG. 9 is a flowchart showing a modified automatic engine restart control routine as a modification of the first embodiment.

For example, the motor vehicle 20 of the first embodiment may adopt a modified automatic engine restart control routine of FIG. 9, in place of the automatic engine restart control routine of FIG. 4. In the modified automatic engine restart control routine of FIG. 9, the engine ECU 70 executes the processing of steps S300 to S350, which is identical with the processing of steps S200 to S250 in the automatic engine restart control routine of FIG. 4. The modified automatic engine restart control routine of FIG. 9 skips the regulation of the amount of fuel Q2 to be injected next time into the cylinder Cyin, but immediately resets the fuel injection control execution flag F2 to zero (step S355) and executes the standard engine start control (step S360). The modified automatic engine restart control also specifies the amount of fuel Q1 corresponding to the piston stop position Pin of the cylinder Cyin stopping in the intake stroke and actually injects the specified amount of fuel Q1 into the cylinder Cyin. This arrangement thus improves the startability of the engine 30, compared with the conventional engine start control.

The automatic engine restart control routine of FIG. 4 specifies the amount of fuel Q1 corresponding to the piston stop position Pin of the cylinder Cyin stopping in the intake stroke (step S220) and actually injects the specified amount of fuel Q1 into the cylinder Cyin (step S230). One modified control procedure may not vary the amount of fuel Q1 to be injected into the cylinder Cyin corresponding to the piston stop position Pin of the cylinder Cyin but may inject a fixed amount of fuel into the cylinder Cyin.

The automatic engine restart control routine of FIG. 4 reads the amount of fuel Q1 to be injected into the intake port 36 of the cylinder Cyin and the remaining amount of fuel Q1rest unconsumed for the first combustion from the preset maps. The amount of fuel Q1 and the remaining amount of fuel Q1rest may be computed according to preset computational expressions in each cycle of the control routine. The automatic engine restart control routine of FIG. 4 estimates the remaining amount of fuel Q1rest unconsumed for the first combustion based on both the piston stop position Pin of the cylinder Cyin and the amount of fuel Q1 initially injected into the cylinder Cyin. The remaining amount of fuel Q1rest may be estimated based on only the piston stop position Pin of the cylinder Cyin or based on only the amount of fuel Q1 initially injected into the cylinder Cyin.

The automatic engine restart control routine of FIG. 4 identifies a misfire based on the engine rotation speed Ne. The identification of a misfire may be based on a variation in engine rotation speed Ne, a variation in internal pressure of the cylinder Cyin, or a variation in inner temperature of the cylinder Cyin.

The automatic engine restart control routine of FIG. 4 regulates the amount of fuel Q2 to be injected into the intake port 36 of the cylinder Cyin (step S260). One possible modification may regulate the total amount of fuel to be injected into all cylinders until completion of a preset number of combustions or until an increase in engine rotation speed Ne to a preset level.

Figure 10:
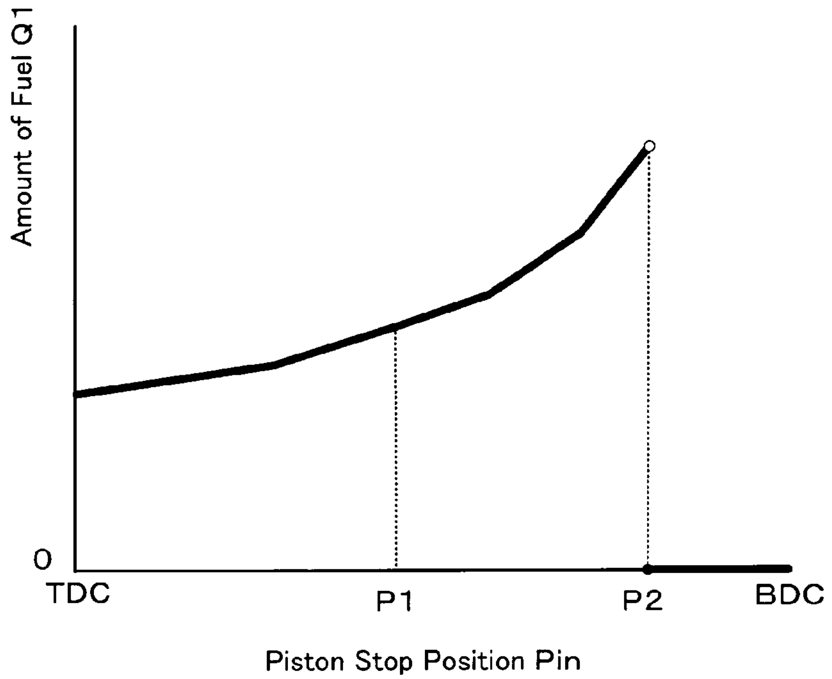
FIG. 10 is a map showing another variation in amount of fuel Q1 against the piston stop position Pin of the cylinder Cyin.

The automatic engine restart control routine of FIG. 4 adopts the map of FIG. 5 to set the amount of fuel Q1, which is to be injected into the intake port 36 of the cylinder Cyin stopping in the intake stroke. In the map of FIG. 5, the amount of fuel Q1 to be injected into the cylinder Cyin stopping in the intake stroke is fixed to the preset constant value Q1*const* in the piston stop position Pin between the top dead center and the predetermined middle position P1 of the intake stroke. The amount of fuel Q1 gradually increases with a variation in piston stop position Pin approaching from the predetermined middle position P1 to the predetermined BDC-nearby position P2. The automatic engine restart control may adopt a map of FIG. 10, in place of the map of FIG. 5. In the map of FIG. 10, the amount of fuel Q1 gradually increases with a variation in piston stop position Pin approaching from the top dead center to the predetermined BDC-nearby position P2. In this modified arrangement, the estimation of the remaining amount of fuel Q1rest unconsumed for the first combustion at step S260 in the automatic engine restart control may be based on a preset map corresponding to the map of FIG. 10 or may be according to a computational expression.

In either of the maps of FIG. 5 and FIG. 10 adopted by the automatic engine restart control routine of FIG. 4, the amount of fuel Q1 is set equal to zero in the piston stop position Pin between the predetermined BDC-nearby position P2 and the bottom dead center. The amount of fuel Q1 may increase with a variation in piston stop position Pin approaching from the predetermined BDC-nearby position P2 to the bottom dead center. In this modified arrangement, the estimation of the remaining amount of fuel Q1rest unconsumed for the first combustion at step S260 in the automatic engine restart control may be based on a preset corresponding map or may be according to a computational expression.

Figure 11:
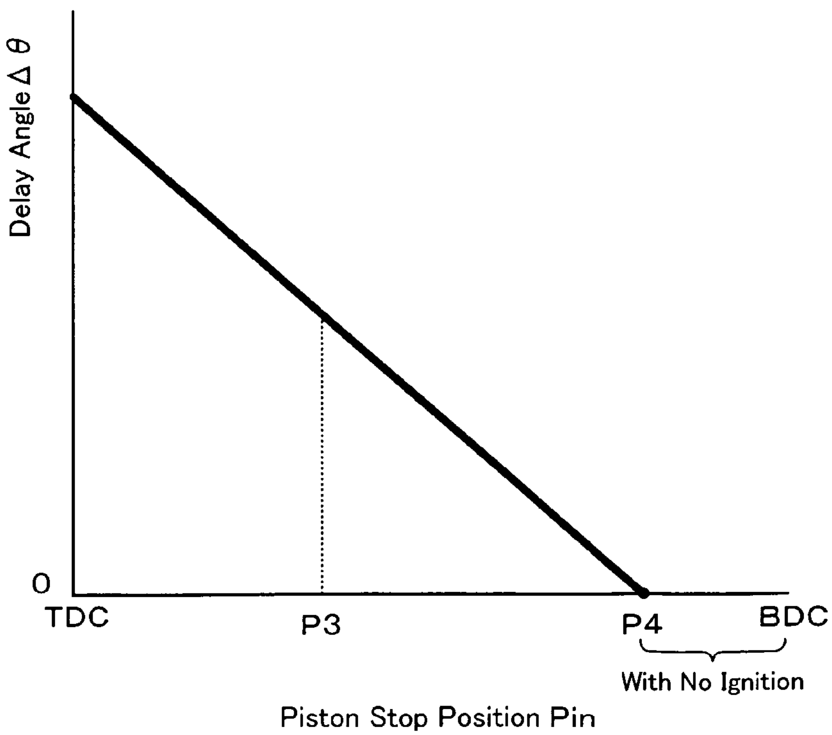
FIG. 11 is a map showing another variation in delay angle Δθ against the piston stop position Pin of the cylinder Cyin.

The automatic engine restart control routine of FIG. 7 adopts the map of FIG. 8 to specify the ignition position 't'. In the map of FIG. 8, the ignition position 't' to ignite the air-fuel mixture in the cylinder Cyin is delayed from the preset reference ignition position 'tb' by the preset constant delay angle Δθconst in the piston stop position Pin between the top dead center and the predetermined middle position P3 of the intake stroke. The delay angle Δθ gradually decreases to give a smaller delay to the ignition position 't' from the reference ignition position 'tb' with a variation in piston stop position Pin approaching from the predetermined middle position P3 to the predetermined BDC-nearby position P4. The automatic engine restart control may adopt a map of FIG. 11, in place of the map of FIG. 8. In the map of FIG. 11, the delay angle Δθ decreases to give a smaller delay to the ignition position 't' from the reference ignition position 'tb' with a variation in piston stop position Pin approaching from the top dead center to the predetermined BDC-nearby position P4. The cylinder Cyin has low gas intake performance having low potential of producing the air-fuel mixture suitable for combustion with the variation in piston stop position Pin of the cylinder Cyin from the top dead center to the predetermined BDC-nearby position P4. This arrangement desirably stabilizes the level of combustion torque on a start of the engine 30 even under the condition of low gas intake performance.

Figure 12:
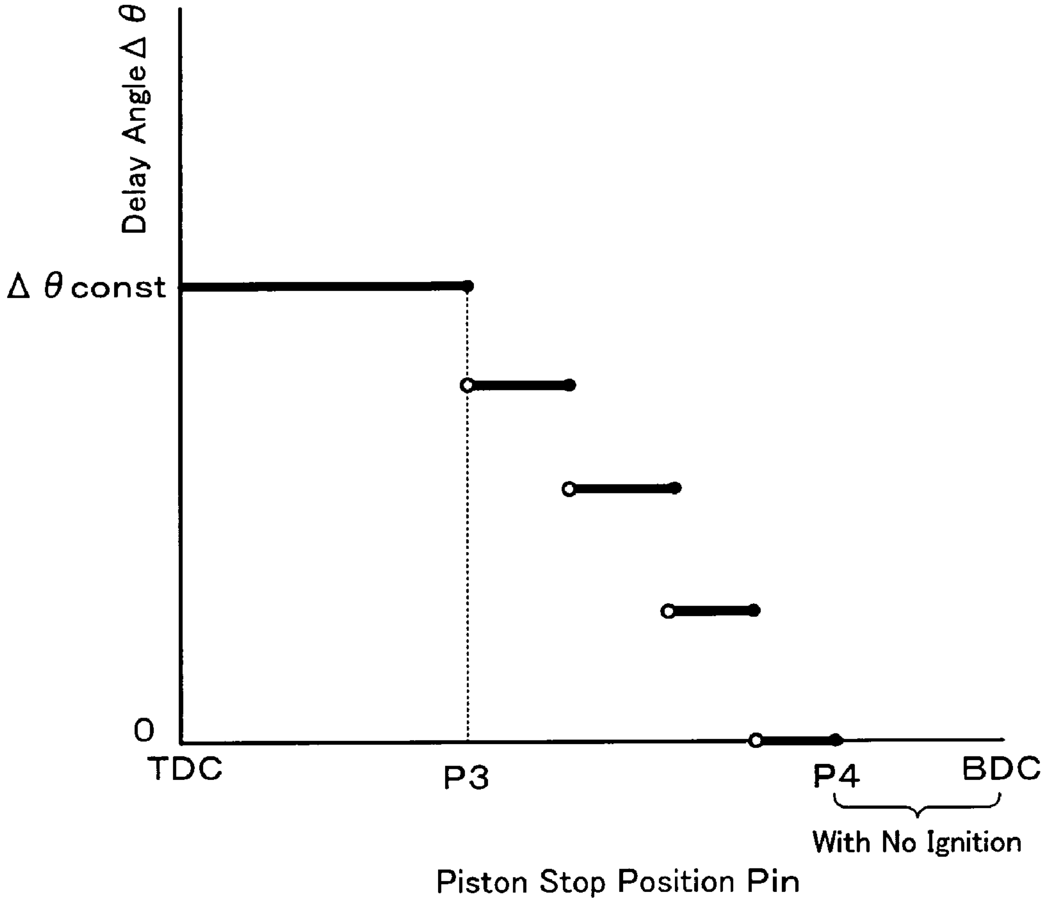
FIG. 12 is a map showing still another variation in delay angle $\Delta\theta$ against the piston stop position Pin of the cylinder Cyin.

In the map of FIG. 8 adopted by the automatic engine restart control routine of FIG. 7, the delay angle Δθ is set to continuously decrease with a variation in piston stop position Pin approaching from the predetermined middle position P3 to the predetermined BDC-nearby position P4. The delay angle Δθ may be set to decrease stepwise with a variation in piston stop position Pin approaching from the predetermined middle position P3 to the predetermined BDC-nearby position P4 as shown in the map of FIG. 12.

The automatic engine restart control routine of FIG. 7 starts cranking the engine 30 at step S435 without fuel injection into the intake port 36 of the cylinder Cyin, upon determination of step S420 that the piston stop position Pin is located between the predetermined BDC-nearby position P4 and the bottom dead center of the intake stroke. One possible modification may skip the determination of step S420 but may unconditionally inject a preset amount of fuel into the intake port 36 of the cylinder Cyin at step S425. The automatic engine restart control of this modified arrangement may specify the ignition position 't' at step S440 to have a smaller delay from the reference ignition position 'tb' with a variation in piston stop position Pin approaching from the predetermined BDC-nearby position P4 to the bottom dead center.

The automatic engine restart control routine of FIG. 4 adopts the map of FIG. 5 to reduce the misfire rate and improve the startability of the engine 30. The map of FIG. 5 shows a variation in amount of fuel Q1 to be injected into the intake port 36 of the cylinder Cyin against the piston stop position Pin of the cylinder Cyin. The automatic engine restart control may adopt a map representing a variation in amount of fuel Q1 against the piston stop position Pin with the purpose of stabilizing the combustion torque to a substantially constant level on a start of the engine 30. The increased amount of fuel injection naturally facilitates introduction of the fuel into the cylinder 31. The greater amount of fuel is to be injection into the intake port 36 of the cylinder Cyin under the condition of low gas intake performance defined by the piston stop position Pin, compared with the amount of fuel injection under the condition of high gas intake performance. This arrangement regulates the combustion torque to a substantially constant level and thereby stabilizes the level of combustion torque on a start of the engine 30.

Figure 13:
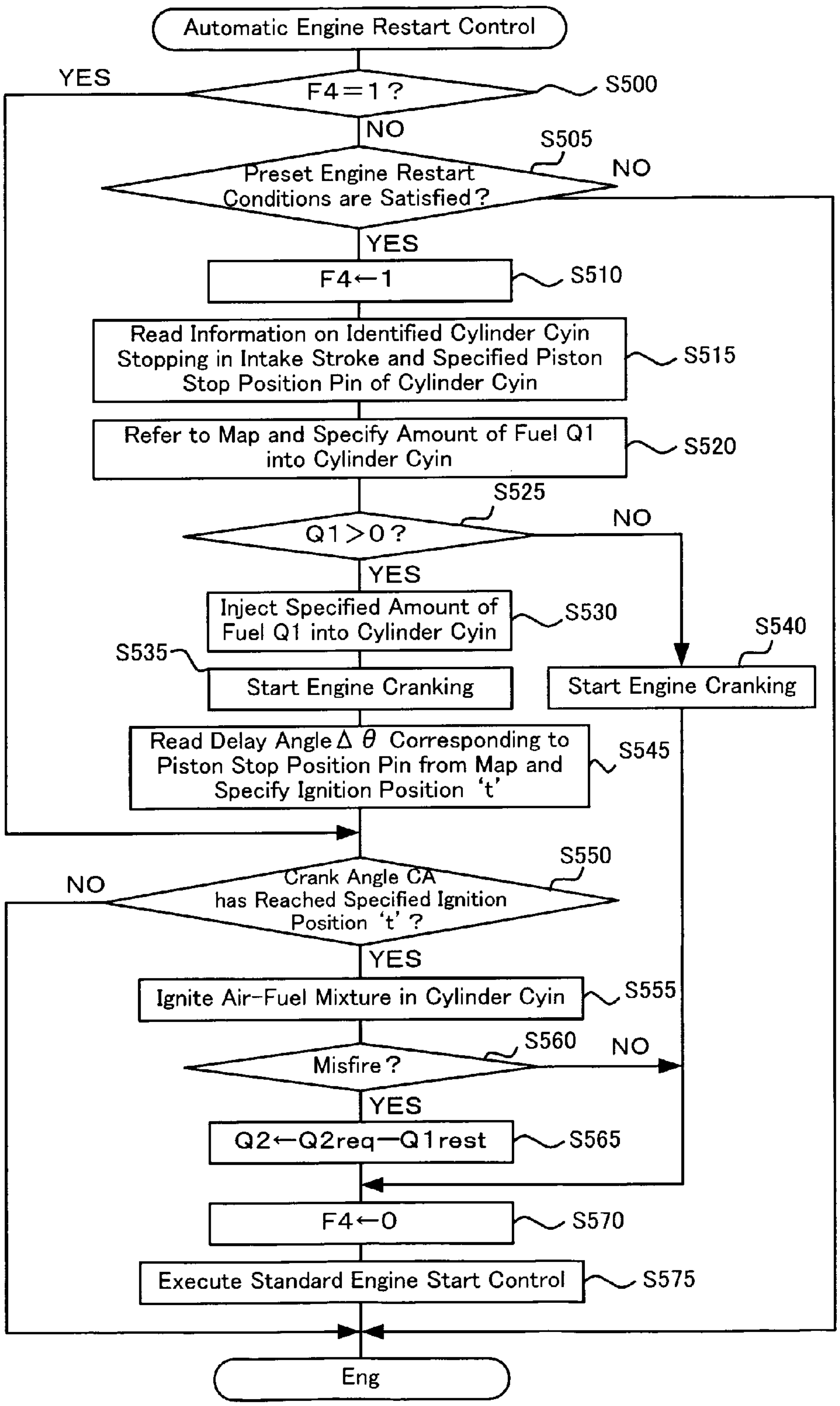
FIG. 13 is a flowchart showing a modified automatic engine restart control routine as a modification of the second embodiment.

The automatic engine restart control routine of FIG. 4 and the automatic engine restart control routine of FIG. 7 are executed separately in the motor vehicle 20 of the first embodiment and the second embodiment. These two control flows may be combined to one automatic engine restart control routine as shown in the flowchart of FIG. 13. In the automatic engine restart control routine of FIG. 13, upon identification of an automatic engine restart control flag F4 equal to zero at step S500, the engine ECU 70 executes the processing of steps S505 to S540, which is identical with the processing of steps S205 to S240 in the automatic engine restart control routine of FIG. 4. The automatic engine restart control flag F4 equal to 0 represents that the engine ECU 70 is not currently executing the automatic engine restart control routine of FIG. 13, while the automatic engine restart control flag F4 equal to 1 represents that the engine ECU 70 is currently executing the automatic engine restart control routine of FIG. 13. The engine ECU 70 refers to a preset map representing a variation in delay angle Δθ against the piston stop position Pin and reads the delay angle Δθ corresponding to the piston stop position Pin from the preset map to specify the ignition position 't' at step S545. This map is prepared by taking into account the amount of fuel Q1 to be injected into the cylinder Cyin. The engine ECU 70 then executes the processing of step S550, which is identical with the processing of step S445 in the automatic engine restart control routine of FIG. 7. Such control varies both the amount of fuel Q1 to be injected into the intake port 36 of the cylinder Cyin and the ignition position 't' to ignite the air-fuel mixture in the cylinder Cyin according to the piston stop position Pin, thus reducing the misfire rate and stabilizing the level of combustion torque on the start of the engine 30. The automatic engine restart control may refer to a preset map representing a variation in amount of fuel Q1 to be injected into the cylinder Cyin against the piston stop position Pin of the cylinder Cyin with the purpose of stabilizing the combustion torque to a substantially constant level on a start of the engine 30, and may read the amount of fuel Q1 corresponding to the piston stop position Pin from the preset map at step S520. The substantially constant level of combustion torque on the start of the engine 30 is attained by varying the amount of fuel Q1 to be injected and the ignition position 't' according to the piston stop position Pin. This arrangement more effectively stabilizes the level of combustion torque on the start of the engine 30, compared with the control of varying only the amount of fuel Q1 according to the piston stop position Pin or the control of varying only the ignition position 't' according to the piston stop position Pin.

The first crank angle sensor 58*a* and the second crank angle sensor 58*b* are MRE rotation sensors in the above embodiments, but may be resolver rotation sensors that utilize a phase difference between an output voltage and an excitation voltage to measure the crank angle.

The engine in the above embodiments and their modifications is the 4-cylinder engine. The technique of the invention is also applicable to other multiple-cylinder engines. For example, in a 6-cylinder engine, two cylinders simultaneously enter the intake stroke at some timing. The control procedure described in any of the above embodiments and modifications is executed to control these two cylinders.

The embodiments and their modifications described above regard application of the invention to the motor vehicle 20 with the idle stop function. The engine start control method of the invention is also applicable to a hybrid vehicle that has a motor generator and is constructed to transmit power of the motor generator to a drive shaft.

The present application claims priority from Japanese Patent Application No. 2004-365908 filed on Dec. 17, 2004, and Japanese Patent Application No. 2005-177472 filed on Jun. 17, 2005, contents of which are incorporated herein by reference in their entirety.

INDUSTRIAL APPLICABILITY

The technique of the present invention is preferably applicable to automobile industries and diversity of other industries relating to power machineries equipped with engines.

The invention claimed is:

1. An engine start control apparatus that performs control, upon satisfaction of a preset engine restart condition in an engine stop state, to inject a fuel from a fuel injection unit, which is attached to a specific cylinder stopping in an intake stroke, into an intake port of the specific cylinder and to implement first combustion in the specific cylinder on a start of an engine, said engine start control apparatus comprising:

a detection unit that detects a piston stop position of the specific cylinder stopping in the intake stroke in the engine stop state;

an engine restart condition judgment module that determines whether the preset engine restart condition is satisfied in the engine stop state;

a fuel injection control module that, upon determination of satisfaction of the preset engine restart condition by said engine restart condition judgment module, specifies an amount of fuel, which is to be injected into the intake port of the specific cylinder stopping in the intake stroke, corresponding to the piston stop position detected by the detection unit, and controls the fuel injection unit to inject the specified amount of fuel into the intake port of the specific cylinder; and a misfire identification module that identifies whether the first combustion on the start of the engine results in a misfire, the misfire identification module identifying a misfire when a rotation speed of the engine does not reach a preset threshold value upon completion of a first expansion stroke of the specific cylinder, wherein upon identification of a misfire by said misfire identification module, said fuel injection control module estimates a remaining amount of fuel unconsumed for the first combustion, computes an amount of fuel, which is to be injected next time into the intake port of the specific cylinder stopping in the intake stroke in the engine stop state, from the estimated remaining amount of fuel, and controls the fuel injection unit to inject the computed amount of fuel into the intake port of the specific cylinder.

2. An engine start control apparatus in accordance with claim 1, wherein said fuel injection control module sets a fixed amount to the amount of fuel, which is to be injected into the intake port of the specific cylinder stopping in the intake stroke, in the detected piston stop position between a top dead center and a predetermined middle position of the intake stroke, and increases the amount of fuel to be injected with a variation in detected piston stop position approaching from the predetermined middle position toward a bottom dead center.

3. An engine start control apparatus in accordance with claim 1, wherein said fuel injection control module increases the amount of fuel, which is to be injected into the intake port of the specific cylinder stopping in the intake stroke, with a variation in detected piston stop position approaching from a top dead center toward a bottom dead center of the intake stroke.

4. An engine start control apparatus in accordance with claim 1, wherein said fuel injection control module sets zero to the amount of fuel, which is to be injected into the intake port of the specific cylinder stopping in the intake stroke, in the detected piston stop position between a predetermined bottom dead center nearby position and a bottom dead center of the intake stroke.

5. An engine start control apparatus in accordance with claim 1, wherein said engine restart condition judgment module determines whether the preset engine restart condition is satisfied during a stop of the engine by idle stop control, and said fuel injection control module controls the fuel injection unit to inject the specified amount of fuel into the intake port of the specific cylinder stopping in the intake stroke during the stop of the engine by the idle stop control.

6. An engine start control apparatus in accordance with claim 1, wherein said fuel injection control module subtracts the estimated remaining amount of fuel from a required amount of fuel determined corresponding to a driver's demand and sets a result of the subtraction to the amount of fuel, which is to be injected next time into the intake port of the specific cylinder stopping in the intake stroke in the engine stop state.

7. An engine start control apparatus in accordance with claim 1, wherein said fuel injection control module estimates the remaining amount of fuel unconsumed for the first combustion, based on at least one of a piston stop position of the specific cylinder stopping in the intake stroke in the engine stop state and an amount of fuel initially injected into the intake port of the specific cylinder.

8. An engine start control apparatus in accordance with claim 1, wherein the detection unit includes a first crank angle sensor and a second crank angle sensor to measure a crank angle of the engine, and the first crank angle sensor and the second crank angle sensor are arranged to discriminate a phase difference between output pulses of the first crank angle sensor and output pulses of the second crank angle sensor in reverse rotation of a crankshaft of the engine from a phase difference in normal rotation of the crankshaft.

9. A vehicle equipped with the engine start control apparatus in accordance with claim 1 mounted thereon.

10. An engine start control method that controls, upon satisfaction of a preset engine restart condition in an engine stop state, to inject a fuel into an intake port of a specific cylinder stopping in an intake stroke, and to implement first combustion in the specific cylinder on a start of an engine, said engine start control method comprising the steps of:

(a) detecting a piston stop position of the specific cylinder stopping in the intake stroke in the engine stop state;

(b) determining whether the preset engine restart condition is satisfied in the engine stop state; and (c) upon determination of satisfaction of the preset engine restart condition by said step (b), specifying an amount of fuel, which is to be injected into the intake port of the specific cylinder stopping in the intake stroke, corresponding to the piston stop position detected by said step (a), and injecting the specified amount of fuel into the intake port of the specific cylinder;

(d) determining whether the first combustion on the start of the engine results in a misfire by comparing a rotation speed of the engine to a preset threshold value upon completion of a first expansion stroke of the specific cylinder, a determination of misfire being made when the rotation speed of the engine does not reach the preset threshold value; and (e) upon determination of a misfire, estimating a remaining amount of fuel unconsumed for the first combustion, computing an amount of fuel, which is to be injected into the intake port of the specific cylinder prior to the next combustion in the specific cylinder, from the estimated remaining amount of fuel, and injecting the computed amount of fuel into the intake port of the specific cylinder.

* * * * *